United States Patent [19]

Matsuo et al.

[11] Patent Number: 4,680,046

[45] Date of Patent: Jul. 14, 1987

[54] METHOD OF PREPARING PREFORMS FOR OPTICAL FIBERS

[75] Inventors: Nobutaka Matsuo; Masanobu Motoki; Yoshitaka Itoh; Sadao Kanbe; Haruo Osafune, all of Nagano, Japan

[73] Assignee: Seiko Epson Kabushiki Kaisha, Tokyo, Japan

[21] Appl. No.: 782,773

[22] Filed: Oct. 2, 1985

[30] Foreign Application Priority Data

Oct. 5, 1984 [JP] Japan ................. 59-209362
Feb. 12, 1985 [JP] Japan ................. 60-25031

[51] Int. Cl.$^4$ .......................................... C03B 37/016
[52] U.S. Cl. ................................ 65/17; 65/3.11; 65/18.1; 350/96.34; 501/12
[58] Field of Search ............ 501/12; 65/17, 3.11, 65/18.1, 18.2, 3.12; 350/96.34

[56] References Cited

U.S. PATENT DOCUMENTS

| | | | |
|---|---|---|---|
| 4,173,459 | 11/1979 | Aulich et al. | 65/13 X |
| 4,324,576 | 4/1982 | Matsuyama et al. | 65/26 |
| 4,417,910 | 11/1983 | Passaret | 65/3.12 |
| 4,419,115 | 12/1983 | Johnson et al. | 65/3.12 |
| 4,574,063 | 3/1986 | Scherer | 65/18.1 X |

FOREIGN PATENT DOCUMENTS 2023571  1/1980  United Kingdom ............. 65/3.11

*Primary Examiner*—Robert Lindsay
*Attorney, Agent, or Firm*—Blum Kaplan

[57] ABSTRACT

A method of preparing preforms for optical fibers is provided. The method includes preparation of a first sol solution of a silicon alkoxide hydrolyzed with an acid and ultrafine particle silica, placement of the first sol solution into a container, and gelation of the first sol solution while the container is being rotated to yield a wet gel having a center hole. A second sol solution having a different composition than the first sol solution is prepared and used to fill the center hole in the wet gel. The second sol solution is then gelled to a wet gel composite and the composite is dried and sintered to yield the preform.

41 Claims, No Drawings

METHOD OF PREPARING PREFORMS FOR OPTICAL FIBERS

BACKGROUND OF THE INVENTION

This invention relates to preforms for optical fibers and, in particular, to a method of preparing preforms for silicic optical fibers.

Preforms are used as a parent material for silicic optical fibers. Two methods dominate the field of preform manufacture. These methods are: (1) VAD method, and (2) MCVD method.

In the VAD method, developed by Nippon Telephone and Telegram, a material gas, such as silicon tetrachloride ($SiCl_4$) or germanium tetrachloride ($GeCl_4$), is transferred over an oxygen/hydrogen burner to yield fine particles of glass. The fine particles of glass are attached to the end of a seed bar. This is accomplished by spraying the fine particles so that they grow into a porous preform in the direction of the axis of the seed bar. Once the preform is prepared, it is heated so that it becomes transparent.

According to the MCVD method, developed by Bell Laboratories, a material gas, such as silicon tetrachloride ($SiCl_4$) or germanium tetrachloride ($GeCl_4$), is blown using oxygen gas to form a silica glass tube. The glass tube is heated from the outside in order to carry out the reaction and to yield fine particles of glass. The fine particles of glass are attached to the inner surface of the tube so that the tube no longer has a center hole. Then the openings at the end of the tube are closed by heating and a transparent preform is obtained.

Although the VAD and MCVD methods for preparing preforms are most commonly used, other methods are known. These include the OVD method, POD method and sol-gel method.

These conventional methods of preparing preforms for optical fibers have many disadvantages. For example, all of the VAD, MCVD, OVD and POS methods are gas phase and involve the chemical reaction of the gas material. For this reason, they have a low reaction yield and low productivity. Furthermore, it is difficult to obtain a preform having a desired refractive index distribution. Additionally, the manufacturing machines required are expensive and consequently, the preforms are also expensive.

While using the sol-gel method makes it possible to provide a glass at a significantly lower cost than can be provided using the gas phase methods, it is difficult to provide a glass article that is large enough to be used as a preform for optical fibers. An example of a sol-gel method is disclosed in Japanese Laid-Open Publication No. 55/100231 of Hitachi Co., Ltd.

Accordingly, it is desirable to provide a method for preparing preforms for optical fibers of larger dimension and higher quality than those which can be provided using prior art methods and which overcomes the disadvantages inherent in the prior art.

SUMMARY OF THE INVENTION

In accordance with the invention, a silica glass preform for forming optical fibers is formed from at least two sol solutions having different dopant concentrations, including 0%, and including ultrafine particle silica. The sol solutions are used sequentially to prepare tubular wet gels having concentric layers of different dopant concentrations. The tubular wet gels are dried and sintered to yield the preforms.

The preforms are formed by adjusting the pH and effective silica content of the prepared sol solutions to a predetermined value. The first sol solution is placed into a rotating container and gelled while the container is rotating to yield a wet gel. The center hole of the wet gel is filled with the second sol solution having a second dopant concentration and gelled. The wet gel having concentric layers of different dopant concentrations and refractive indices is then dried to a dry gel and the dry gel is sintered to obtain a transparent glass preform.

In an alternative embodiment, more than two sol solutions, each having different dopant concentrations, are gelled in the same cylindrical rotating container in sequential steps. The step of gelling a sol while rotating the container can be performed as many times as is necessary.

Accordingly, it is an object of the present invention to provide an improved method for preparing preforms for optical fibers.

Another object of the invention is to prepare preforms for silicic optical fibers of high quality and at low cost.

A further object of the invention is to provide preforms for optical fibers of large size.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and an article of manufacture possessing the features, properties and relation of elements which will be exemplified in the article hereinafter described, and the scope of the invention will be indicated in the claims.

DETAILED DESCRIPTION OF THE PREFERRED EMBODIMENTS

In accordance with the invention preforms for silicic optical fibers having concentric layers of different dopant concentrations are prepared. An acid hydrolyzed solution of silicon alkoxide is prepared and doped with a suitable doping agent, such as a metal alkoxide. The doping agent is added to change the refractive index of the silica glass obtained in the final sintering step.

The acid hydrolyzed solution is used to prepare at least two sol solutions of different dopant concentrations and ultrafine particle silica. The ultrafine particle silica can be obtained by hydrolyzing silicon alkoxide with a basic reagent and water or, alternatively, can be used in the form of fumed silica. The pH and effective glass content of the sol solutions are adjusted to predetermined values.

The first sol solution is placed into a cylindrical rotating container and gelled while the container is rotating to yield a tubular wet gel. The second sol solution is then placed into the center hole of the tubular wet gel and gelled. The multi-layer tubular wet gel is dried to a dry gel and the dry gel is sintered to obtain transparent glass preforms having concentric layers of different refractive indices.

In the first step in accordance with this method, a silicon alkoxide is hydrolyzed with an acid. The silicon alkoxide has the general formula $Si(OR)_4$ wherein R is an alkyl group. The silicon alkoxide can include, but is not limited to, silicon methoxide, silicon ethoxide, silicon propoxide, and the like. In an especially preferred embodiment, silicon ethoxide is used. Alternatively, these materials can be referred to as alkyl silicates, such as methyl silicate, ethyl silicate, propyl silicate and the like, with ethyl silicate being the preferred species.

The acid hydrolyzed solution of silicon alkoxide and metal alkoxide is prepared by first partially hydrolyzing the silicon alkoxide with water. The metal alkoxide is introduced into the partially hydrolyzed silicon alkoxide solution in an amount that is effective to carry out the reaction. Then the alkoxide groups, with the exception of any alkoxide groups of alcohol that may be present, are hydrolyzed by the addition of water.

The amount of water which is suitable for partially hydrolyzing the silicon alkoxide is between about 1 and 3 moles based on the molar amount of the silicon alkoxide. If an attempt is made to partially hydrolyze the silicon alkoxide with less than about one mole of water per mole of silicon alkoxide, the solution is gelled as soon as the hydrolysis is commenced.

On the other hand, if the water is used in an amount of more than 3 moles of water per mole of silicon alkoxide, a small amount of water is likely to be present in the reaction solution. This causes formation of fine particles of metal alkoxide due to the reaction of metal alkoxide and water when the metal alkoxide is added to the partially hydrolyzed silicon alkoxide solution. The fine particles of metal alkoxide prevent clarification of the glass when the glass is sintered and make the refractive index distribution of the glass unstable.

During the partial hydrolysis of the silicon alkoxide, the solution temperature is preferable to be kept below about 10° C. If the solution temperature is higher than about 10° C., the viscosity of the solution increases and the solution is gelled abruptly.

In a preferred embodiment, the silicon alkoxide is partially hydrolyzed with a solution of water and alcohol. The volume ratio of alcohol to silicon alkoxide is more than about 20%. Most preferably, the volume ratio of alcohol to silicon alkoxide is about 40%.

The use of an alcohol in addition to water allows the hydrolysis to be carried out more uniformly. Furthermore, a hydrolyzed solution of low viscosity and good stability is obtained without requiring that the reaction solution be maintained at a temperature less than about 10° C. Additionally, the amount of water to be used to partially hydrolyze the silicon alkoxide is not restricted to a molar ratio of between about 1 and 3. Specifically, when an alcohol is used, the molar ratio of water to silicon alkoxide can fall within the wider range of between about 0.1 and 3.9. However, since the alcohol content in the wet gel formed from the sol solution using this hydrolyzed solution is somewhat higher than desired, care must be taken when the wet gel is dried.

After the silicon alkoxide is partially hydrolyzed, a suitable dopant is introduced. The dopant can be used in the form of a metal alkoxide. The metal can be selected from the group consisting of lithium, sodium, potassium, cesium, boron, aluminum, gallium, germanium, nitrogen, prosphorus, fluorine, zirconium, titanium, tantalum, telurium, lead and silver.

The metal alkoxide has the formula $M(OR)_n$ wherein M is a metal, R is an alkyl group having from 1 to 12 carbon atoms and n is an integer representing the number of alkoxide groups in the compound as determined by the valence of the metal. Suitable metal alkoxides can include, but are not limited to, aluminum tri-alkoxide $(Al(OR)_3)$, titanium tetra-alkoxide $(Ti(OR)_4)$, germanium tetra-alkoxide $(Ge(OR)_4)$, zirconium tetra-alkoxide $(Zi(OR)_4)$, and the like.

The purpose of the dopant and, in particular, the metal alkoxide, is to change the refractive index of the silica glass product. In a preferred embodiment, germanium tetra-alkoxide is used as the dopant. Germanium tetra-alkoxide dopant provides a high clarity, high quality silica glass product that is large enough to be used as the preform for optical fibers. The metal alkoxide is used in an amount greater than 0% with respect to the amount of silicon alkoxide used.

The remaining alkoxide groups, except those in any alcohol which may be present, are hydrolyzed by addition of water. The resulting solution is the acid hydrolyzed solution.

Dopant may be doped in a form of fine particle or to sol solution.

Fine particle silica is then introduced into the acid hydrolyzed solution to obtain a sol solution. The ultrafine particle silica can be obtained by hydrolyzing silicon alkoxide with a basic reagent and water, or may be used in the form of fumed silica. The silicon alkoxide can include, but is not limited to, silicon methoxide, silicon ethoxide, silicon propoxide, and the like. In an especially preferred embodiment, silicon ethoxide is used. The base can include, but is not limited to, ammonia water or ammonia gas and water.

Alternatively, fumed silica, also known as white carbon, can be used and is commercially available, for example, under the trade names Cab-O-Sil (Cabot Corp., Boston, Mass.), Aerosil (Degussa Co.), D.C. Silica (Dow Corning Co.), and Arc Silica (PPG Co.). Fumed silica is made by hydrolyzing silicon tetrachloride in the presence of an oxy-hydrogen flame burner.

In accordance with the invention, the mean particle diameter of the ultrafine particle silica is between about 0.01 and 1.0 μm and a suitable silica concentration is greater than about 0.15 g/ml. If the mean particle diameter of the ultrafine particle silica is too small, the viscosity of the solution increases and it is difficult to obtain a solution having a silica concentration that is high enough for practical use. For this reason, the lower limit of the acceptable mean particle diameter is 0.01 μm.

On the other hand, if the mean particle diameter is too large, fine particle silica settles out when the sol solution is gelled in a rotating cylindrical container. Centrifugal forces acting on the sol solution in the rotating cylindrical container cause the silica particles to be distributed radially outward towards the outer surface of the gel. This causes fracture of the gel when the wet gel is dried. For this reason, the upper limit of acceptable mean particle diameter of the ultrafine particle silica is 1.0 μm.

It has been found that a suitable concentration of ultrafine particle silica in the sol solution is more than about 0.15 g/ml. If the concentration of ultrafine particle silica is too low, the degree of shrinkage when the wet gel is dried to a dry gel is large. This frequently causes the gel to fracture when it is dried.

The mean particle diameter of the ultrafine particle silica, preferably is between about 0.01 and 0.4 μm and the concentration is greater than about 0.25 g/ml. This is based on an experimental investigation of the conditions which are suitable for making silica glass articles with good yield.

Once the sol solution containing dopant and ultrafine particle silica is prepared, it is placed into a cylindrical rotating container. The sol solution is gelled while the container is rotated. In addition to the mean particle diameter of the ultrafine particle silica, it is necessary to control the rate of rotation of the cylindrical container and the time required for gelation of the sol solution. By properly controlling these variables, the effect of centrifugal force, i.e. the settling out of the silica particles in the radial direction of the wet gel that causes the wet gel to fracture during the drying step, can be eliminated.

Specifically, the rotation rate should be limited to less than about 50,000 RPM and the time required for gelation should be limited to less than about 10 hours. Suitable rotating rates and gelation times depend on the size of the container used. In preparing preforms for optical fibers that are of a practical size, i.e. more than about 10 mm in diameter, a rotation rate of between about 200 and 5,000 RPM is preferred. If the rotation rate is less than about 200 RPM, it is difficult to obtain a wet gel having a smooth inner surface around the axis of rotation. It has been determined experimentally that 200 RPM is the lower limit of the acceptable rotation rate when a wet gel is being formed.

In accordance with the invention, a wet gel consisting of concentric layers is formed. Specifically, multilayers having different dopant concentrations are formed inside each other by repeatedly performing the steps of placing a sol solution into a container and rotating the container until the solution is gelled. Thereafter, the center hole of the wet gel can be filled with another gel. This is accomplished by placing an additional sol solution into the center of the wet gel and gelling the solution without rotating the container. In a preferred embodiment, the container is cylindrical and the wet gel is tubular.

In preparing preforms for optical fibers in accordance with this invention, it is desirable to control the degree of shrinkage that occurs when the wet gel is dried to a dry gel and also when the dry gel is sintered to a transparent glass. If the degree of shrinkage is high, the dry gel is likely to fracture during sintering, thereby lowering the yield. The degree of shrinkage is controlled by controlling the concentration of effective glass forming components in the sol solution. The glass forming components are the total of the amount of silica and the amount of metal in the sol solution.

It is desirable to have the concentration of glass forming components in the sol solution as high as possible. However, if the concentration of glass forming components is too high, the viscosity of the sol solution increases and makes handling difficult. Furthermore, additional elaborate operations are required in order to raise the effective glass concentration and these operations are not practical to perform. It has been determined experimentally that the volume of the transparent glass product is preferable to be between about 5 and 15% of the volume of the wet gel and that the sol solution should be prepared so that this volume ratio is met.

The degree of shrinkage when the wet gel is converted to a transparent glass article is preferable to be constant regardless of the concentration of dopant in the wet gel. In other words, it is preferable to be necessary to adjust the concentration of effective glass components in the sol solution so that the volume ratio of the wet gel to the transparent glass article is nearly constant regardless of the dopant concentration of the sol solution. This condition is essential for obtaining a transparent glass article according to the present invention.

In accordance with the present invention, the drying step is important in this regard and greatly influences the yield of the dry gel. In order to avoid fracture when a wet gel is dried to a dry gel, it is necessary for the inside of the wet gel to be dried uniformly. The inside of the wet gel is uniformly dry when it is dried slowly. However, if the wet gel is dried too slowly manufacturing costs increase significantly.

It is, therefore, desirable to optimize productivity by drying the gel in a relatively short period of time with good yield. This can be accomplished by placing the wet gel into a second container, specifically, a drying container. The drying container should have a lid with openings amounting to less than about 10% of the surface area of the lid. The gel is then heated to a temperature between about 40° and 160° C. at a heating rate of less than about 120° C. per hour. The wet gel is dried at the selected temperature.

Alternatively, the wet gel can be dried in the cylindrical rotating container used for gelation. Preferably, the lid of the cylindrical rotating container is replaced with a second lid having openings amounting to less than about 10% of the surface area of the lid. In this case, a dry gel is obtained using less procedural steps and with good yield. The yield is improved, however, by placing the wet gel into a second container, as described. If a plurality of wet gels are placed into a second container and dried, the production of dry gels is enhanced without affecting the yield.

The complete sintering process includes the following seven steps:
1. Removing absorbed water;
2. Removing carbon;
3. Accelerating the dehydration concentration reaction;
4. Removing hydroxyl (OH) groups;
5. Removing chloride (Cl) or fluoride (F);
6. Closing pores in the dry gel; and
7. Making the dry gel into transparent glass article.

Step 1, removal of absorbed water, has a significant influence on the yield of final product. A great deal of physically absorbed water exists in the dry gel and this water can be eliminated by heat treatment of the dry gel at a temperature up to about 400° C. If an attempt is made to heat the gel too quickly in order to remove the absorbed water, the gel frequently tends to crack, thereby reducing the yield. On the other hand, if the heating rate is slow, the yield is improved, but manufacturing costs increase due to the length of time involved. It has been determined experimentally that the dry gel should be heated at a rate of no more than about 400° C. per hour in order to optimize yield and manufacturing costs. The dry gel should be maintained at a temperature less than about 400° C. for a period of at least about one hour. The step of maintaining the gel at a selected temperature contributes to removal of the water from the inside of the gel uniformly and increases yield. To improve yield further, this step may be carried out more than once.

In Step 2 of the sintering process carbon is eliminated using a second heat treatment. The final temperature of this heat treatment should be between about 400° to 900° C. As in Step 1, the heating rate has an influence on the yield; however, not as great an influence as the heating rate used in Step 1. Experimental observation has shown that the most suitable heating rate is between about 30° and 400° C. per hour. Furthermore, this step should be performed under an oxygen ($O_2$) atmosphere. If salts of ammonia and acid (i.e. ammonium salts) are present in the dry gel, these salts are removed with the carbon in Step 2.

The third step of the sintering process represents acceleration of the dehydration reaction and a concentration of the gel by reduction of unreacted hydroxyl (OH) groups. This step is optional. However, it has been found that when Step 3 is omitted and Step 4 is included (Step 4 being removal of OH groups), a large amount of OH group removing agent is consumed and foaming frequently occurs when the dry gel is converted into transparent glass.

Step 3 is carried out by heating the dry gel to a temperature between about 900° and 1200° C. The heating rate is between about 30° and 400° C. per hour and the dry gel is maintained at the selected temperature for at least one-half hour. As in Steps 1 and 2, the heating rate in Step 3 has an effect on the yield, although the range mentioned is suitable. Step 3 can also be repeated more than once.

Step 4, removal of hydroxyl (OH) groups in the dry gel, is also an important step. The number of OH groups in the silica glass preform bears a close relationship to the transmission loss of the optical fiber prepared from the preform.

The hydroxyl groups are removed by heating the dry gel to a temperature between about 700° and 1100° C. A carrier gas and a hydroxyl group removing agent are provided as the atmosphere in the sintering oven. The removing agent is used in an amount greater than about 1% with respect to the carrier gas. Preferably, from about 1% to 40% of hydroxyl group removing agent is used with respect to the carrier gas. The carrier gas provides an inert atmosphere and should not include impurities, such as water. Suitable carrier gases include, but are not limited to, helium (He), neon (Ne), argon (Ar) and nitrogen ($N_2$).

The hydroxyl group removing agent is preferably a reagent which reacts with silicon hydroxide (SiOH) to form silicon chloride (SiCl) or silicon fluoride (SiF). Based on cost and ease of handling, chlorine gas ($Cl_2$), chlorine sulfoxide (SOCl), sulfur hexafluoride ($SF_6$), carbon tetrafluoride ($CF_4$), ethane hexafluoride ($C_2F_6$), and propane octafluoride ($C_3F_8$) are suitable.

In Step 5, chloride or fluoride, which has been introduced into the gel in Step 4, is removed. If Step 5 is omitted and the sintering proceeds, chloride or fluoride existing in the silica glass tends to cause foaming when the dry gel is converted into a transparent silica glass preform, or when an optical fiber is formed by fiber-drawing the preform. The chloride or fluoride is removed by flowing a gas, such as helium (He) or the other inert carrier gases mentioned above and oxygen ($O_2$), into the sintering oven. Oxygen is used in an amount of between about 1% and 100% with respect to the amount of carrier gas used. The temperature should be between about 800° to 1200° C.

In Step 6 the pores of the dry gel are closed. Step 6 is accomplished by heating the dry gel in a vacuum or under a helium (He) atmosphere. If the pores are closed without vacuum conditions or He atmosphere, the gas in the atmosphere is enclosed in the pores. This causes foaming when the dry gel is converted into a transparent glass article. As in previous steps, the heating rate of the dry gel has an effect on the yield and a suitable heating rate is between about 30° and 400° C. per hour. The final temperature is between about 900° and 1350° C.

The temperature at which the pores are closed depends on the ratio of the concentration of the effective glass forming components and the ultra fine particle silica concentration in the hydrolyzed solution used for preparing the sol, the mean particle diameter of the ultra fine particle silica, the particle diameter distribution of the ultra fine particle silica, the particular dopant used, the concentration of dopant, the distribution of the diameters of the micro pores in the gel, the water content of the gel, heating rate and so on. Accordingly, it is necessary to determine a final temperature based on an investigation of the reagent used in the step of closing the pores. The temperature should fall within the specified range.

In Step 7, the dry gel is converted into transparent silica glass. This is accomplished by heating the dry gel to a temperature between about 1200° and 1600° C. and maintaining the temperature for a predetermined period of time. When Step 7 is completed, after maintaining the gel at the selected temperature for the predetermined period, a transparent glass preform that is useful for making optical fibers is obtained.

The optimal temperature program for each step of the sintering process varies with the ratio of effective glass component concentration and ultrafine particle silica concentration in the hydrolyzed solution used for preparing the sol solution, the mean particle diameter of the ultrafine particle silica, the distribution of the particle diameters of the ultrafine particle silica, the particular dopant used, the dopant concentration, the distribution of the diameter of the micropores in the gel, the water content in the gel and the like. Suitable temperatures and heating rates are selected from specified ranges.

In accordance with the present invention, suitably large and high quality preforms for optical fibers are provided. By following the steps described good yield can be achieved. For a better understanding of the present invention, reference is made to the following examples. These examples are presented for purposes of illustration only and are not intended to be construed in a limiting sense.

EXAMPLE 1

Preparation of Hydrolyzed Solutions 199.5 g of 0.02 normal hydrochloric acid was added to 576.6 g of refined commercially available silicon ethoxide and the solution was stirred violently in order to hydrolyze the silicon ethoxide. The resulting solution was referred to as "Solution A."

17.4 g of 0.2 normal hydrochloric acid was added to 134.1 g of refined commercially available silicon ethoxide and the solution was stirred violently while the temperature was maintained below 5° C. After about 30 minutes, the solution became uniformly transparent. While the solution was maintained at a temperature less than 5° C., 11.65 g of germanium tetra ethoxide was slowly added with stirring in order to carry out the hydrolysis of the germanium tetra ethoxide. The reaction conditions were maintained constant for 20 minutes and then 32.3 g of water was added while maintenance of the solution temperature at less than 5° C. was continued. The resulting solution was referred to as "Solution B."

Preparation of a Solution Containing Ultrafine Particle Silica 881.0 g of refined commercially available silicon ethoxide, 4708 ml of anhydrous ethanol, 282.24 ml of ammonia water (29%) and 304.8 g of water were mixed and stirred violently for 2 hours. The solution was maintained without stirring in a cool dark place overnight in order to yield ultrafine particle silica. 6000 ml of the ultrafine particle silica solution was concentrated under reduced pressure to 700 ml and the pH was adjusted from 8.22 to 4.00. Foreign particles and the like were removed using centrifugal separation and about 795 ml of a solution containing 254.1 g of ultrafine particle silica having a mean particle diameter of 0.14 $\mu$m was obtained. The values of the amount of silica in the solution and the mean particle diameter of the silica were calculated based on a concentration of silica of 0.320 g/ml and a yield of 100%.

Preparation of Sol Solutions and Gelation

A solution A and 4/5 of the solution containing ultrafine particle silica were mixed and the resulting solution was referred to as "Sol Solution A." Similarly, Solution B and the remaining 1/5 of the solution containing ultrafine particle silica were mixed and the resulting solution was referred to as "Sol Solution B." The volume of Sol Solution A was 1450 ml and the pH of Sol Solution A was 3.62; the volume of Sol Solution B was 360 ml and the pH of Sol Solution B was 2.78.

The pH of Sol Solution A was adjusted to 4.71 by addition of 0.2 normal ammonia water and water and the volume of Sol Solution A was adjusted to 1600 ml. The concentration of the effective glass component in pH adjusted Sol Solution A was calculated at 0.2310 g/ml.

1206.4 ml of pH adjusted Sol Solution A was placed into a cylindrical rotating container. The cylindrical container was made of vinyl chloride and had a silicon coated inner surface. The dimensions of the container were 40 mm inner diameter, 1020 mm length and 1256.6 ml volume. Both ends of the cylindrical rotating container were covered with lids and the container was set in a rotating machine. Thirty minutes after the pH was adjusted to 4.71, rotation of the cylindrical container containing the pH adjusted sol solution was begun at a rotating rate of 750 RPM. The sol was gelled 10 minutes after rotation began, but the rotation was continued for an additional 10 minutes in order to yield a tubular wet gel. The tubular wet gel had dimensions of 40 mm outer diameter, 8.0 mm inner diameter and 1000 mm length and was contained in the cylindrical rotating container.

Separately, the pH of Sol Solution B was adjusted to 4.12 using 0.2 normal ammonia water and water and the volume of Sol Solution B was adjusted to 400 ml. The concentration of the effective glass component of pH adjusted Sol Solution B was calculated to be 0.2355 g/ml.

The cylindrical container containing the tubular wet gel was removed from the rotating machine and set upright. The pH adjusted Sol Solution B was placed into the center hole of the wet gel in the cylindrical container 12 minutes after the tubular wet gel was formed. The pH adjusted Sol Solution B was gelled within 10 minutes from the time the pH was adjusted. A wet gel having concentric layers of different dopant concentrations was obtained.

Drying 10 wet gels formed as described were aged in sealed cylindrical rotating containers at 30° C. for 2 days. Then the wet gels were placed into polypropylene box containers having openings amounting to 0.4% of the surface area of the container. The container was placed in a dryer at 60° C. and the wet gels were dried. After drying the gels for 14 days, 10 dry gels which were stable enough so that no fractures occurred even at room temperature were obtained. Yield of dry gels: 100%. The mean dimensions of the dry gels were 27.0 mm outer diameter and 675 mm length.

Sintering

The dry gels were placed into a tubular quartz sintering oven and heated from 30° to 200° C. at a heating rate of 30° C. per hour, maintained at 200° C. for 5 hours, and then heated from 200° to 300° C. at a heating rate of 30° C. per hour and maintained at 300° C. for 5 hours in order to remove absorbed water.

The gels were heated from 300° to 1100° C. at a heating rate of 30° C. per hour and maintained at 1100° C. for 30 minutes in order to remove carbon and ammonium chloride and to accelerate the dehydration concentration reaction.

The gels were cooled to 700° C. and maintained at 700° C. while a mixture of helium (He) and chloride (Cl$_2$) flowed through the sintering oven at rates of 2 l/min and 0.2 l/min, respectively. Then the gels were heated to 800° C. at a heating rate of 60° C. per hour while He only flowed through the oven. The gels were maintained at 800° C. for 1 hour while a mixture of He and Cl$_2$ flowed through the oven at rates of 2 l/min and 0.2 l/min, respectively. The gels were then heated to 900° C. at a heating rate of 60° C. per hour while He only flowed through the oven and the gels were maintained at 900° C. for 1 hour while a mixture of He and Cl$_2$ flowed through the oven at rates of 2 l/min and 0.2 l/min, respectively in order to remove hydroxide groups.

The resulting gels were heated to 1050° C. at a heating rate of 60° C. per hour while a mixture of helium and oxygen flowed through the oven at rates of 2 l/min and 0.4 l/min, respectively, and the gels were maintained at 1050° C. for 1 hour in order to remove chloride. The gels were heated to 1250° C. at a heating rate of 30° C. per hour while helium only flowed through the oven and the gels were maintained at 1250° C. for 30 minutes in order to close the pores in the gels.

The gels were placed into a box oven and heated from 1200° to 1350° C. at a heating rate of 60° C. per hour. The gels were maintained at 1350° C. for 1 hour. The gels became non-porous and transparent preforms for optical fibers were obtained.

There were no fractures during sintering and the yield of preforms from dry gels was 100%. The dimensions of the preforms for optical fibers were 18.8 mm diameter and 470 mm length. The diameter of the core was 3.7 mm and the loss was less than 1%.

The number of hydroxide groups in the preforms was estimated by measuring the infrared absorption spectrum. No absorption peak was seen at a wavelength of 2.7 $\mu$m, indicating that the number of hydroxide groups was less than 1 ppm.

Furthermore, even when a jacket tube of silica was fused to the preform for optical fibers and the preform was fiber drawn, no foaming occurred and high quality single mode optical fiber was obtained.

EXAMPLE 2

Solutions A and B were prepared as described in Example 1 except that 0.02 normal nitric acid was used instead of 0.02 normal hydrochloric acid and 0.2 normal nitric acid was used instead of 0.2 normal nitric acid.

Solutions A and B were each mixed with the solution containing ultrafine particle silica and pH adjusted in the same manner as described in Example 1. Furthermore, the Sol Solutions A and B were gelled, dried and sintered as described in Example 1. The yield of preforms for optical fibers was 90%.

Similar preforms for optical fibers were obtained when Solutions A and B were prepared using sulfuric acid or acetic acid instead of hydrochloric acid or nitric acid.

EXAMPLE 3

The steps of Example 1 were performed using silicon methoxide as the silicon alkoxide in Solutions A and B. 421.1 g of silicon methoxide was used to prepare Solution A and 97.9 g of silicon methoxide was used to prepare Solution B. All other steps were carried out exactly as described in Example 1. The yield of preforms for optical fibers was 90%.

EXAMPLE 4

199.5 g of 0.02 normal hydrochloric acid was added to 576.6 g of refined commercially available silicon ethoxide and the solution was stirred violently in order to hydrolyze the silicon ethoxide. The resulting solution was referred to as "Solution A."

11.6 g of 0.02 normal hydrochloric acid was added to 134.1 g of refined commercially available silicon ethoxide. The temperature was maintained below 5° C. and the solution was stirred violently. After about 50 minutes had elapsed, the reaction solution became transparent but was also partially gelled. The solution was, therefore, nonuniform.

Extensive experimentation showed that even when the silicon ethoxide was partially hydrolyzed with water at a molar ratio of less than about 1 mole of water per mole of silicon ethoxide, the resulting solution did not become uniform.

EXAMPLE 5

199.5 g of 0.02 normal hydrochloric acid was added to 576.6 g of refined commercially available silicon ethoxide and the solution was stirred violently in order to hydrolyze the silicon ethoxide. The resulting solution was referred to as "Solution A."

40.6 g of 0.2 normal hydrochloric acid was added to 134.1 g of refined commercially available silicon ethoxide. The temperature was maintained at less than 5° C. and the solution was stirred violently. The reaction solution became transparent after about 25 minutes had elapsed. While maintenance of the solution at a temperature below 5° C. was continued, 11.65 g of germanium tetraethoxide was slowly added. The reaction solution was turbid and a uniform solution was not obtained.

Extensive experimentation showed that when silicon ethoxide was partially hydrolyzed with water at a molar ratio of more than about 3 moles of water per mole of silicon ethoxide, and germanium tetraethoxide was added into the solution containing excess water, turbidity resulted and the distribution of silica and germania did not become uniform.

EXAMPLE 6

17.4 g of 0.2 normal hydrochloric acid was added to 134.1 g of refined commercially available silicon ethoxide and the solution was stirred violently. Gelation of the reaction solution began after about 30 minutes had elapsed.

Extensive experimentation showed that gelation was likely to occur unless the reaction solution was kept at a temperature less than about 10° C. Furthermore, unless a temperature of less than 10° C. was maintained during the steps of adding germanium tetra alkoxide and of hydrolysis, gelation occurred readily and undesirably.

EXAMPLE 7

Preparation of Hydrolyzed Solutions 218 ml of anhydrous ethanol was added to 549.1 g of refined commercially available silicon ethoxide and the solution was completely stirred. 190.0 g of 0.02 normal hydrochloric acid was added and the solution was stirred violently in order to hydrolyze the silicon ethoxide. The resulting solution was referred to as "Solution A."

55 ml of anhydrous ethanol was added to 127.7 g of refined commercially available silicon ethoxide and the solution was completely stirred. Then 11.0 g of 0.02 normal hydrochloric acid was added and the solution was stirred violently for 1 hour. 11.10 g of germanium tetraethoxide was slowly added into the reaction solution in order to carry out the hydrolysis. After 20 minutes, 36.3 g of 0.02 normal hydrochloric acid was added and the solution was stirred in order to complete the hydrolysis. The resulting solution was referred to as "Solution B."

Preparation of a Solution Containing Ultrafine Particle Silica 839.0 g of refined commercially available silicon ethoxide, 4484 ml of anhydrous ethanol, 269.0 ml of ammonia water (29%) and 290.3 g of water were mixed. The mixture was stirred for 2 hours and then maintained without stirring overnight in a cool dark place in order to synthesize ultrafine particle silica.

5700 ml of the ultrafine particle silica solution was concentrated under reduced pressure to a volume of 640 ml and the pH was adjusted from 8.22 to 4.60 by addition of 2 normal hydrochloric acid. Foreign particles and the like were removed by centrifugal separation to yield 710 ml of ultrafine particle silica solution. The solution contained 242.0 g of ultrafine particle silica having a mean particle diameter of 0.14 $\mu$m. The values for the weight of ultrafine particle silica and mean particle diameter were calculated assuming that the concentration of silica was 0.341 g/ml and the yield was 100%.

Preparation of Sol Solutions and Gelation

Solution A and 4/5 of the solution containing ultrafine particle silica were mixed and the solution was referred to as "Sol Solution A." Similarly, Solution B and the remaining 1/5 of the solution containing ultrafine particle silica were mixed and the solution was referred to as "Sol Solution B."

The volume of Sol Solution A was 1550 ml and the pH was 4.54; the volume of Sol Solution B was 390 ml of the pH was 4.57.

The pH of Sol Solution A was adjusted to 5.32 by addition of 0.2 normal ammonia water and water and the volume was adjusted to 1600 ml. The concentration of the effective glass component of the pH adjusted Sol Solution A was calculated to be 0.220 g/ml. 1206.4 ml of the pH adjusted Sol Solution A was placed into a vinyl chloride cylindrical rotating container having a silicon coated inner surface. The dimensions of the container were 40 mm inner diameter, 1020 mm length and 1256.6 ml volume. Both ends of the cylindrical rotating container were covered with lids and the container was set in a rotating machine. Thirty minutes after the pH of Sol Solution A was adjusted to 5.32, rotation of the container was begun at a rate of 1200 RPM. Sol Solution A was gelled within 15 minutes after the rotation began, but the rotation was continued for an additional 10 minutes. A tubular wet gel of 40 mm outer diameter, 8.0 mm inner diameter and 1000 mm length was obtained inside the cylindrical rotating container.

Separately, the pH of Sol Solution B was adjusted to 5.12 by addition of 0.2 normal ammonia water and water and the volume was adjusted to 400 ml. The concentration of effective glass component in pH adjusted Sol Solution B was calculated to be 0.2245 g/ml.

The cylindrical container was removed from the rotating machine and set upright. 12 minutes after the gelation was completed, Sol Solution B was placed into the center hole of the tubular wet gel in the cylindrical container. 10 minutes after the pH of Sol Solution B was adjusted to 5.12, Sol Solution B was gelled and a wet gel containing concentric layers was obtained.

Drying 20 wet gels formed as described were aged in sealed cylindrical rotating containers at 30° C. for 2 days. 10 of the 20 wet gels were then placed into polypropylene drying containers having openings amounting to 0.1% of the surface area of the container. The other 10 gels were left in the cylindrical containers and the ends were covered with lids having openings amounting to 0.1% of the surface area of the lid.

All of the wet gels were placed into a dryer at 60° C. After drying the gels for 17 days, dry gels which were stable enough so that no fractures occurred even at room temperature were obtained. The dry gels had average dimensions of 26.5 mm outer diameter and 664 mm length. The yield of dry gels placed in the drying container was 90% and the yield of dry gels remaining in the cylindrical rotating containers was 80%.

Sintering

The 17 remaining dry gels were sintered as described in Example 1 and preforms for optical fibers were obtained with a yield of 100%. The dimensions of the preforms were 18.5 mm outer diameter and 463 ml length. The diameter of the core was 3.7 mm.

The hydroxide groups were measured by measuring the infrared absorption spectrum. No absorption peak was seen at a wavelength of 2.7 μm, indicating that the number of hydroxide groups was less than 1 part per million.

Furthermore, no foaming occurred even when optical fiber was produced by fiber drawing. The optical fiber was of high quality.

As can be seen in this example, when Solutions A and B are prepared using alcohol, it is not necessary to cool the solutions. This is more practical than the case in which alcohol is not used.

Additionally, the viscosity of the hydrolyzed solutions, the sol solution and the ultrafine particle silica containing solution was lowered when alcohol was used. The solutions were, therefore, easier to handle.

EXAMPLE 8

Preparation of Hydrolyzed Solution 218 ml of anhydrous ethanol was added to 549.1 g of refined commercially available silicon ethoxide and the solution was completely stirred. 190.0 g of 0.02 normal hydrochloric acid was added to the solution and the solution was stirred violently in order to hydrolyze the silicon ethoxide. The solution was referred to as "Solution A."

55 ml of anhydrous ethanol was added to 127.7 g of refined commercially available silicon ethoxide and the solution was stirred. 11.0 g of 0.02 normal hydrochloric acid was added to the solution and the solution was stirred violently for 1 hour.

135.4 g of germanium tetra isopropoxide was slowly added to the solution and the solution was stirred. 20 minutes later, 36.3 g of 0.02 normal hydrochloric acid was added to the solution and the hydrolysis was carried out with sufficient stirring. The solution was referred to as "Solution B."

Preparation of a Solution Containing Ultrafine Particle Silica 839.0 g of refined commercially available silicon ethoxide, 4484 ml of anhydrous ethanol, 134.6 ml of ammonia water (29%) and 290.3 g of water were mixed. The mixture was stirred violently for 2 hours and then maintained without stirring in a cool dark place overnight in order to synthesize ultrafine particle silica.

5550 ml of the solution were concentrated under reduced pressure to a volume of 640 ml and the pH was adjusted from 8.10 to 4.60 by addition of 2 normal hydrochloric acid. Foreign particles and the like were removed by centrifugal separation and 710 ml of solution containing ultrafine particle silica was obtained. The solution contained 242.0 g of ultrafine particle silica having a mean particle diameter of 0.07 μm. The concentration of silica in the solution was calculated at about 0.341 g/ml.

Preparation of Sol Solutions and Gelation

Solution A and 4/5 of the solution containing ultrafine particle silica were mixed and ultrasonic vibration was applied in order to uniformly disperse the ultrafine particle silica in the solution. The resulting solution was referred to as "Sol Solution A."

Similarly, Solution B and the remaining 1/5 of the solution containing ultrafine particle silica were mixed and ultrasonic vibration was applied in order to uniformly disperse the ultrafine particle silica in the solution. The resulting solution was referred to as "Sol Solution B."

The volume of Sol Solution A was 1550 ml and the pH of Sol Solution A was 4.52. The volume of Sol Solution B was 390 ml and the pH of Sol Solution B was 4.57.

The pH of Sol Solution A was adjusted to 5.32 by the addition of 0.2 normal ammonia water and water and the volume was adjusted to 1600 ml. The concentration of the effective glass component in pH Adjusted Sol Solution A was calculated to be 0.220 g/ml. 1206.4 ml of pH adjusted Sol Solution A was placed into a metal cylindrical rotating container having a silicon coated inner surface. The dimensions of the cylindrical rotating container were 40 mm inner diameter, 1020 mm length and 1256.6 ml volume. Both ends of the container were covered with lids and the container was set in a rotating machine. Thirty minutes after the pH of Sol Solution A was adjusted to 5.32, rotation was begun. The rotation rate was 900 RPM. The sol gelled in 13 minutes, but rotation was continued for an additional 10 minutes. A tubular wet gel was formed inside the cylindrical rotating container. The wet gel had dimensions of 8 mm inner diameter, 40 mm outer diameter and 1000 mm length.

Separately, the pH of Sol Solution B was adjusted to 5.12 by addition of 0.2 normal ammonia water and water and the volume was adjusted to 400 ml. The concentration of the effective glass component in pH adjusted Sol Solution B was calculated to be 0.2243 g/ml. The cylindrical rotating container was removed from the rotating machine and set upright. Twelve minutes after the tubular wet gel was gelled, pH Adjusted Sol Solution B was placed into the center hole of the tubular wet gel. Sol Solution B was gelled 10 minutes after the pH was adjusted to 5.12. A wet gel having concentric layers was obtained.

Drying 10 dry gels formed as described were aged in sealed cylindrical rotating containers at 30° C. for 2 days. Then the dry gels were placed into a drying container having openings amounting to 0.1% of the surface area of the container and the container was placed into a dryer at 58° C. By drying the wet gels for 17 days, 10 dry gels were obtained. The dry gels were sufficiently stable so that fracturing did not occur even at room temperature. The average dimensions of the dry gels were 26.2 mm outer diameter and 658 mm length. The yield of dry gels was 100%.

Sintering

The 10 dry gels were sintered as described in Example 1 and preforms for optical fibers were obtained. The yield of preforms was 100%. The dimensions of the preforms averaged 18.5 mm diameter and 463 mm length. The diameter of the core averaged 3.7 mm.

The hydroxide groups in the preforms were measured by measuring the infrared absorption spectrum. No absorption peak was seen at a wavelength of 2.7 μm, indicating that the number of hydroxide groups in the preform was less than 1 ppm.

No foaming occurred when optical fibers were formed by wire drawing. The quality of the optical fibers was high.

EXAMPLE 9

Preparation of Hydrolyzed Solutions 218 ml of anhydrous ethanol was added to 549.1 g of refined commercially available silicon ethoxide and the solution was completely stirred. 190.0 g of 0.2 normal hydrochloric acid was added and the solution was stirred violently in order to hydrolyze the silicon ethoxide. The solution was referred to as "Solution A."

55 ml of anhydrous ethanol was added to 127.7 g of refined commercially available silicon ethoxide and the solution was completely stirred. 11.0 g of 0.2 normal hydrochloric acid was added and the solution was stirred violently for 1 hour. 11.10 g of germanium tetraethoxide was slowly added to the solution with stirring. After 20 minutes, 36.3 g of 0.2 normal hydrochloric acid was added. The solution was referred to as "Solution B."

Preparation of a Solution Containing Ultrafine Particle Silica 839.0 g of refined commercially available silicon ethoxide, 4484 ml of anhydrous ethanol, 269.0 ml of ammonia water (29%) and 290.3 g of water were mixed and the solution was stirred violently for 2 hours. The solution was maintained in a cool dark place overnight in order to synthesize the ultrafine particle silica. 5700 ml of the solution was concentration under reduced pressure to a volume of 1350 ml. The pH of the solution was adjusted to 4.5 by addition of 2 normal hydrochloric acid and foreign particles were removed using centrifugal separation. 1600 ml of a solution containing ultrafine particle silica was obtained. The concentration of silica was about 0.151 g/ml.

Preparation of Sol Solutions and Gelation

Solution A and 4/5 of the solution containing ultrafine particle silica were mixed and the resulting solution was referred to as "Sol Solution A." Similarly, Solution B and the remaining 1/5 of the solution containing ultrafine particle silica were mixed and the solution was referred to as "Sol Solution B." The volume of Sol Solution A was 2250 ml and the pH of Sol Solution A was 4.44. The volume of Sol Solution B was 560 ml and the pH was 4.47.

The pH of Sol Solution A was adjusted to 5.60 by addition of 0.2 normal ammonia water and water and the volume was adjusted to 2400 ml. The concentration of effective glass component in pH adjusted Sol Solution A was calculated to be 0.146 g/ml.

1206.4 ml of pH adjusted Sol Solution A was placed into a vinyl chloride cylindrical rotating container having a silicon coated inner surface. The container had the dimensions 40 mm inner diameter, 1020 mm length and 1256.6 ml volume. Both ends of the cylindrical rotating container were covered with lids and the container was set in a rotating machine. Thirty minutes after the pH of Sol Solution A was adjusted, rotation of the cylindrical container was begun at a rotating rate of 1500 RPM. Sol Solution A was gelled in 25 minutes after the rotation began, but the rotation was continued for another 10 minutes in order to yield a tubular wet gel inside the cylindrical container. The dimensions of the tubular wet gel were 40 mm outer diameter, 8.0 mm inner diameter and 1000 mm length.

Separately, the pH of Sol Solution B was adjusted to 5.12 by addition of 0.2 normal ammonia water and water and the volume was adjusted to 600 ml. The concentration of effective glass component in pH adjusted Sol Solution B was calculated to be 0.149 g/ml.

The cylindrical rotating container was removed from the rotating machine and set upright. Thirty minutes after the tubular wet gel had been gelled, Sol Solution B was placed into the center hole of the tubular wet gel. Fifteen 15 minutes from the time the pH of Sol Solution B was adjusted to 5.12, Sol Solution B was also gelled. A wet gel having concentric layers was obtained.

Drying 10 wet gels formed as described were aged in a sealed cylindrical rotating container at 30° C. for 2 days. The gels were then placed into a drying container having openings amounting to 0.1% of the surface area of the container. The container was placed into a dryer and dried at 60° C. for 17 days. Three dry gels were obtained. The dry gels were sufficiently stable so that no fractures occurred even at room temperature. The average dimensions of the dry gels were 23.2 mm outer diameter and 584 mm length. The yield of dry gels was 30%.

Sintering

The 3 dry gels were sintered as described in Example 1 and preforms for optical fibers were obtained. The yield of preforms from dry gels was 100%. The average dimensions of the preforms were 16.0 mm diameter and 401 mm length. The average diameter of the core was 3.2 mm.

The hydroxide groups in the preforms were measured by measuring the infrared absorption spectrum. No absorption peak was seen at a wavelength of 2.7 μm. This indicated that the number of hydroxide groups in the preforms was less than 1 ppm.

Furthermore, no foaming occurred when optical fibers were formed from the preforms by wire drawing. The optical fibers were of high quality.

As can be seen from this example, when the silica concentration of the solution containing ultrafine particle silica was about 0.15 g/ml, resulting in a transparent glass preform having a volume of only 6.6% of the volume of the starting wet gel, high quality preforms for optical fibers are obtained. However, the yield of the preforms when they are dried is low, specifically, 30%, and this is not economical. Furthermore, since the degree of shrinkage is large, it is necessary to make large wet gels and this is not practical.

EXAMPLE 10

Preparation of Hydrolyzed Solutions 155 ml of anhydrous ethanol was added to 427.2 g of refined commercially available silicon ethoxide and the solution was completely stirred. 147.8 g of 0.02 normal hydrochloric acid was added and the solution was stirred violently in order to hydrolyze the silicon ethoxide. The resulting solution was referred to as "Solution A."

39 ml of anhydrous ethanol was added to 97.1 g of refined commercially available silicon ethoxide and the solution was completely stirred. 8.4 g of 0.02 normal hydrochloric acid was added and the solution was stirred violently for one hour. 11.0 g of germanium tetra ethoxide was slowly added to the solution with stirring. After the reaction had continued for 20 minutes, 28.4 g of 0.02 normal hydrochloric acid was added and the solution was stirred. The resulting solution was referred to as "Solution B."

Preparation of a Solution Containing Ultrafine Particle Silica 991.4 g of refined commercially available silicon ethoxide, 2650 ml of anhydrous ethanol, 106 ml of ammonia water (29%) and 343.0 g of water were mixed. The solution was stirred violently for 2 hours and maintained in a cool dark place overnight without stirring in order to synthesize the ultrafine particle silica. 4000 ml of the solution was concentrated under reduced pressure to a volume of 770 ml and the pH was adjusted from 8.15 to 4.60 by addition of 2 normal hydrochloric acid. 840 ml of a solution containing 285.0 g of ultrafine particle silica having a mean particle diameter of 0.13 μm was obtained. The concentration of silica was calculated to be 0.340 g/ml. The distribution of the particle diameters of the ultrafine particle silica was inferior to the monodispersity shown in Example 1.

Preparation of Sol Solutions and Gelation

Solution A and 4/5 of the solution containing ultrafine particle silica were mixed and the solution was referred to as "Sol Solution A." Similarly, Solution B and the remaining 1/5 of the solution containing ultrafine particle silica were mixed and the solution was referred to as "Sol Solution B." The volume of Sol Solution A was 1430 ml and the pH was 4.52. The volume of Sol Solution B was 360 ml and the pH was 4.54.

The pH of Sol Solution A was adjusted to 5.28 by addition of 0.2 normal ammonia water and water and the volume was adjusted to 1600 ml. The concentration of the effective glass component in pH adjusted Sol Solution A was calculated to be 0.220 g/ml.

1206.4 ml of pH adjusted Sol Solution A were placed into a vinyl chloride cylindrical rotating container having a silicon coated inner surface. The dimensions of the cylindrical rotating container were 40 mm inner diameter, 1020 mm length and 1256.6 ml volume. Both ends of the container were covered with lids and the container was set in a rotating machine. Thirty minutes after the pH of Sol Solution A was adjusted, rotation began at a rotating rate of 1200 RPM. Sol Solution A was gelled 15 minutes after the start of rotation at a constant rate, but the rotation was continued for another 10 minutes. A tubular wet gel having dimensions of 40 mm outer diameter, 8 mm inner diameter and 1000 mm length was obtained.

Separately, the pH of Sol Solution B was adjusted to 5.08 by addition of 0.2 normal ammonia water and water and the volume was adjusted to 400 ml. This was referred to as "pH Adjusted Sol Solution B." The concentration of effective glass component was calculated to be 0.2243 g/ml.

The cylindrical rotating container was removed from the rotating machine and set upright. Twelve minutes after the tubular wet gel was gelled, Sol Solution B was placed into the center hole of the tubular wet gel. Eleven minutes after the pH of Sol Solution B was adjusted to 5.08, Sol Solution B was gelled and a wet gel of concentric layers was obtained. The dimensions of the wet gel were 40 mm outer diameter and 1000 mm length.

Drying 10 wet gels formed as described were aged in sealed cylindrical rotating containers at 30° C. for 3 days and then placed into a polypropylene drying container having openings amounting to 0.1% of the surface area of the container. After 15 days, 9 dry gels, which were stable enough so that fracturing did not occur even at room temperature, were obtained. The average dimensions of the dry gels were 27 mm outer diameter and 675 mm length. The yield of dry gels was 90%.

Sintering

The dry gels were placed in a tubular quartz sintering oven and heated from 30° to 200° C. at a heating range of 30° C. per hour, maintained at 200° C. for 5 hours, heated from 200° to 300° C. at a heating rate of 30° C. per hour and maintained at 300° C. for 5 hours in order to remove absorbed water.

Then the gels were heated from 300° to 1050° C. at a heating rate of 30° C. per hour and maintained at 1050° C. for 30 minutes in order to remove carbon and ammonium chloride and to accelerate the dehydration concentration reaction. The gels were cooled to 700° C. and maintained at 700° C. while a mixture of He and $Cl_2$ flowed through the oven at rates of 2 l/min and 0.2 l/min, respectively. The gels were heated to 800° C. at a heating rate of 60° C. per hour while He gas only flowed through the oven. The dry gels were maintained at 800° C. for one hour while a mixture of He and $Cl_2$ flowed through the oven at rates of 2 l/min and 0.2 l/min, respectively. The gels were heated to 900° C. at a rate of 60° C. per hour while He gas only flowed through the oven. The dry gels were maintained at 900° C. for one hour while a mixture of He and $Cl_2$ flowed through the oven at rates of 2 l/min and 0.2 l/min, respectively, in order to remove hydroxide groups.

The gels were then heated to 1000° C. at a rate of 60° C. per hour while a mixture of He and $O_2$ flowed through the oven at rates of 2 l/min and 0.4 l/min, respectively. The gels were maintained at 1000° C. for 10 hours in order to remove chloride.

The gels were heated further to 1250° C. at a rate of 30° C. per hour while He only flowed through the oven.

The gels were maintained at 1250° C. for 30 minutes in order to close the pores in the gels.

Four of the dry gels were placed in a box oven and heated from 1200° to 1350° C. at a heating rate of 60° C. per hour. The gels were maintained at 1350° C. for 1 hour in order to make the dry gels non-porous and to yield the transparent preforms for optical fibers. The yield of preforms was 100%.

The remaining 5 dry gels were heated to 1600° C. using a rin heater in order to make the gels non-porous. Transparent preforms for optical fibers were obtained with a yield of 100%.

The dimensions of the preforms averaged 18.5 mm diameter and 461 mm length. The average diameter of the core was 3.7 mm.

The hydroxide groups in the preforms for optical fibers were measured by measuring the infrared absorption spectrum. No absorption peak was seen at a wavelength of 2.7 $\mu$m, indicating that the number of hydroxide groups in the preforms was less than 1 ppm.

Furthermore, no foaming occurred when optical fibers were formed by wire drawing. High quality optical fibes were obtained.

In this example, the ratio of effective glass component of Solution A and the solution containing ultrafine particle silica was 35:65; in Example 7, the ratio of effective glass component in Solution A and in the solution containing ultrafine particle silica was 45:55. Using these solutions, equally high quality preforms for optical fibers were obtained, but the optimal sintering conditions were different.

Extensive experimentation showed that suitable ratios of the effective glass component in Solution A to the effective glass component in the solution containing ultrafine particle silica ranged between about 20:80 and 80:20.

EXAMPLE 11

Preparation of Hydrolyzed Solutions 218 ml of anhydrous ethanol was added to 549.1 g of refined commercially available silicon ethoxide and the solution was completely stirred. 190.0 g of 0.2 normal hydrochloric acid was added and the solution was stirred violently in order to hydrolyze the silicon ethoxide. The resulting solution was referred to as "Solution A."

55 ml of anhydrous ethanol was added to 127.7 g of refined commercially available silicon ethoxide and the solution was completely stirred. 11.0 g of 0.2 normal hydrochloric acid was added and the solution was stirred violently for 1 hour. 11.10 g of germanium tetra ethoxide was slowly added to the solution with stirring. After the reaction had continued for 20 minutes, 36.3 g of 0.02 normal hydrochloric acid was added and the solution was stirred. The solution was referred to as "Solution B."

Preparation of a Solution Containing Ultrafine Particle Silica 839.9 g of refined commercially available silicon ethoxide, 4484 ml of anhydrous ethanol, 448.4 ml of ammonia water (29%) and 290.3 g of water were mixed. The solution was stirred violently for 2 hours and maintained in a cool dark place overnight without stirring in order to synthesize the ultrafine particle silica. 5900 ml of the solution was concentrated under reduced pressure to a volume of 640 ml and the pH was adjusted from 8.45 to 4.60 by addition of 2 normal hydrochloric acid. Foreign particles and the like were removed by centrifugal separation and 730 ml of a solution containing 242.0 g of ultrafine particle silica having a mean particle diameter of 0.33 $\mu$m was obtained. The concentration of silica was calculated to be 0.332 g/ml.

Preparation of Sol Solutions and Gelation

Solution A and 4/5 of the solution containing ultrafine particle silica were mixed and the solution was referred to as "Sol Solution A." Similarly, Solution B and the remaining 1/5 of the solution containing ultrafine particle silica were mixed and the solution was referred to as "Sol Solution B." The volume of Sol Solution A was 1570 ml and the pH of Sol Solution A was 4.57. The volume of Sol Solution B was 390 ml and the pH of Sol Solution B was 4.59.

The pH of Sol Solution A was adjusted to 5.42 by addition of 0.2 normal ammonia water and water and the volume was adjusted to 1600 ml. The concentration of effective glass component of pH adjusted Sol Solution A was calculated to be 0.220 g/ml. 1206.4 ml of pH adjusted Sol Solution A was placed into a vinyl chloride cylindrical rotating container having a silicon coated inner surface. The dimensions of the cylindrical rotating container were 40 mm inner diameter, 1020 mm length and 1256.6 ml volume. The ends of the container were covered with lids and the container was set in a rotating machine. Thirty minutes after the pH of Sol Solution A was adjusted to 5.42, rotation of the cylindrical container was begun at a rotating rate of 550 RPM. Sol Solution A was gelled 13 minutes after starting the rotation, but rotation was continued for an additional 10 minutes in order to yield a tubular wet gel.

Separately, the pH of Sol Solution B was adjusted to 5.19 by addition of 0.2 normal ammonia water and water and the volume was adjusted to 400 ml. The solution was referred to as "pH Adjusted Sol Solution B." The concentration of effective glass component in pH Adjusted Sol Solution B was calculated to be 0.2243 g/ml.

The cylindrical rotating container was removed from the rotating machine and set upright. Twelve minutes after the tubular wet gel was gelled, Sol Solution B was placed into the center hole of the tubular wet gel. Ten minutes after the pH of Sol Solution B was adjusted to 5.19, Sol Solution B was gelled. A wet gel consisting of concentric layers was obtained.

Drying 10 wet gels formed as described were aged in sealed cylindrical rotating containers at 30° C. for 3 days. The gels were then placed into a drying container having openings amounting to 0.1% of the surface area of the container. The drying container was placed in a dryer at 65° C. for 15 days. Seven dry gels which were stable enough so that no fractures occurred even at room temperature were obtained. The average dimensions of the dry gels were 26.7 mm outer diameter and 671 mm length. The yield of dry gels was 70%.

Sintering

The 7 dry gels were sintered as described in Example 1 and 7 preforms for optical fibers were obtained. The yield of preforms from the dry gels was 100%. The average dimensions of the preforms were 18.4 mm diameter and 462 mm length and the diameter of the core averaged 3.6 mm.

The hydroxide groups in the preforms for optical fibers was measured by measuring the infrared absorption spectrum. No absorption peak was seen when the wavelength was 2.7 $\mu$m, indicating that the number of hydroxide groups in the preforms was less than 1 ppm.

Furthermore, no foaming occurred when optical fiber was formed by wire drawing. High quality optical fibers were obtained.

As can be seen in this example, the mean particle diameter of the ultrafine particle silica can be controlled by the amount of alcohol, ammonia water, water and the like added to the silicon alkoxide. If the mean particle diameter of the ultrafine particle silica is 0.33 μm a preform for optical fibers can be obtained. Further extensive experimentation demonstrated that when the mean particle diameter of the ultrafine particle silica was more than 1 μm, the particles settled out during the rotating gelation and it was difficult to form a dry gel.

EXAMPLE 12

Preparation of Hydrolyzed Solutions

Solutions A and B were prepared as described in Example 7.

Preparation of a Solution Containing Ultrafine Particle Silica

A solution containing ultrafine particle silica was prepared as described in Example 7.

Preparation of Sol Solutions and Gelation

The sol solutions were prepared and gelled as described in Example 7, except that the rate of rotation of the cylindrical rotating container was 50,000 RPM. The particles of silica settled out due to the strong centrifugal force resulting from the rotation. Settling out of the silica could be seen with the naked eye. As a result of the settling out of the ultrafine silica particles, all of the gels fractured during the step of drying the wet gels.

Extensive experimentation showed that when a cylindrical rotating container having an inner diameter of 40 mm is used, the rate of rotating the container should be less than 5000 RPM. If a smaller cylindrical rotating container having an inner diameter of, for example, 5 mm, is used, a complete dry gel can be obtained by shortening the rotation time.

EXAMPLE 13

Preparation of Hydrolyzed Solutions

Solutions A and B were prepared as described in Example 7.

Preparation of a Solution Containing Ultrafine Particle Silica

A solution containing ultrafine particle silica was prepared as described in Example 7.

Preparation of Sol Solutions and Gelation

Sol Solutions A and B were prepared as described in Example 7.

The pH of Sol Solution A was adjusted to 5.32 by addition of 0.2 normal ammonia water and water and the volume was adjusted to 1600 ml. The concentration of effective glass component of pH adjusted Sol Solution A was calculated to be 0.220 g/ml. 1158.1 ml of pH adjusted Sol Solution A was placed into a metal cylindrical rotating container having a silicon coated inner surface. The dimensions of the cylindrical rotating container were 40 mm inner diameter, 1020 mm in length and 1256.6 ml volume. The ends of the container were covered with lids and the container was set in a rotating machine. Thirty minutes after the pH of Sol Solution A was adjusted to 5.32, rotation of the container at a rotating rate of 1200 RPM was begun. Sol Solution A was gelled 15 minutes after rotation began, but the rotation was continued for an additional 10 minutes. A tubular wet gel having dimensions of 40 mm outer diameter, 11.2 mm inner diameter and 1000 mm length was obtained.

Separately, the pH of Sol Soluton B was adjusted to 5.12 by addition of 0.2 normal ammonia water and water and the volume was adjusted to 400 ml. This was referred to as "pH Adjusted Sol Solution B." The concentration of the effective glass component in pH Adjusted Sol Solution B was calculated to be 0.2243 g/ml.

The cylindrical rotating container was removed from the rotating machine and set upright. Twelve minutes after the gelation of the tubular wet gel, 48.25 ml of pH Adjusted Sol Solution B was placed into the center hole of the tubular wet gel. The ends of the container were covered and the container was again set in the rotating machine and immediately rotated at a rate of 1200 RPM. Sol Solution B was gelled 10 minutes after the pH was adjusted to 5.12, but rotation was continued for an additional 10 minutes. A tubular wet gel having dimensions of 40 mm outer diameter, 8.0 mm inner diameter and 1000 mm length was obtained.

Drying 10 wet gels formed as described were aged in sealed cylindrical rotating containers at 30° C. for 2 days. The gels were then placed into a drying container of polypropylene having openings amounting to 0.1% of the surface area of the container. The container was placed in a dryer at 60° C. for 17 days. Nine dry gels which were stable enough so that no fractures occurred even at room temperature were obtained. The average dimensions of the dry gels were 26.5 mm outer diameter, 5.3 mm inner diameter and 663 mm length. The yield of dry gels was 90%.

Sintering

Nine dry gels were sintered as described in Example 7 and 9 preforms for optical fibers were obtained. The yield of preforms from dry gels was 100%. The dimensions of the preforms obtained were 18.5 mm outer diameter, 3.7 mm inner diameter and 463 mm length. The diameter of the core was 5.2 mm.

An optical fiber was formed by collapsing and fiber drawing the preform.

The hydroxide groups in the preform for optical fibers was measured by measuring the infrared absorption spectrum. No absorption peak was seen at a wavelength of 2.7 μm. This indicated that the number of hydroxide groups in the preform was less than 1 ppm.

Furthermore, no foaming occurred during fiber drawing and high quality optical fibers were obtained.

EXAMPLE 14

Preparation of Hydrolyzed Solutions 218 ml of anhydrous ethanol was added to 549.2 g of refined commercially available silicon ethoxide and the solution was completely stirred. 190 g of 0.02 normal hydrochloric acid was added and the solution was stirred violently in order to hydrolyze the silicon ethoxide. The solution was referred to as "Solution A."

55 ml of anhydrous ethanol was added to 105.4 g of refined commercially available silicon ethoxide and the solution was completely stirred. 11.7 g of 0.2 normal hydrochloric acid was added and the solution was stirred violently for 1 hour. 36.84 g of germanium tetra ethoxide was added slowly to the solution with stirring. After 20 minutes, 35.2 g of 0.2 normal hydrochloric acid was added with stirring. The resulting solution was referred to as "Solution B."

Preparation of a Solution Containing Ultrafine Particle Silica 839.0 g of refined commercially available silicon ethoxide, 4484 ml of anhydrous ethanol, 269.0 ml of ammonia water (29%) and 290.3 g of water were mixed. The solution was stirred violently for 2 hours and then maintained in a cool dark place without stirring to synthesize the ultrafine particle silica. 5700 ml of the solution were concentrated under reduced pressure to a volume of 640 ml and the pH was adjusted from 8.16 to 4.00 by addition of 2 normal hydrochloric acid. Foreign particles and the like were removed by centrifugal separation and 720 ml of a solution containing 242.0 g of ultrafine particle silica having a mean particle diameter of 0.14 μm was obtained. The concentration of silica was calculated to be about 0.336 g/ml.

Preparation of Sol Solutions and Gelation

Solution A and 4/5 of the solution containing ultrafine particle silica were mixed and the solution was referred to as "Sol Solution A." Similarly, Solution B and the remaining 1/5 of the solution containing ultrafine particle silica were mixed and the solution was referred to as "Sol Solution B." The pH of Sol Solution B was lowered by the addition of 2 normal hydrochloric acid.

The pH of Sol Solution A was adjusted to 5.32 by addition of 0.2 normal ammonia water and water and the volume was adjusted to 1600 ml. The concentration of effective glass component in pH adjusted Sol Solution A was calculated to be 0.220 g/ml. 527.8 ml of pH adjusted Sol Solution A was placed into a vinyl chloride cylindrical rotating container having a silicon coated inner surface. The dimensions of the cylindrical container were 40 mm inner diameter, 520 mm in length and 628.3 ml volume. The ends of the container were covered with lids and the container was set in a rotating machine. Thirty minutes after the pH of Sol Solution A was adjusted to 5.32, rotation of the cylindrical container was begun at a rotating rate of 1200 RPM. Sol Solution A was gelled within 15 minutes of the start of rotation, but the rotation was continued for an additional 10 minutes. A tubular wet gel having dimensions of 40 mm outer diameter, 16 mm inner diameter and 500 mm in length was obtained.

Separately, the pH of Sol Solution B was adjusted to 3.13 by addition of 0.2 normal ammonia water and water and the volume was adjusted to 400 ml. This solution was referred to as "pH Adjusted Sol Solution B." The concentration of the effective glass component in pH Adjusted Sol Solution B was calculated to be 0.2344 g/ml.

The cylindrical rotating container containing the tubular wet gel was removed from the rotating machine and set upright. Twelve minutes after the tubular wet gel was gelled, pH Adjusted Sol Solution B was placed into the center hole of the tubular wet gel. Eleven minutes after the pH of Sol Solution B was adjusted to 3.13, a wet gel consisting of concentric layers was obtained.

Drying 10 wet gels formed as described were aged in sealed cylindrical rotating containers at 30° C. for 10 days. The gels were placed into a polypropylene drying container having openings amounting to 0.1% of the surface area of th container. The drying container was placed in a dryer at 60° C. for 7 days. Seven dry gels that were stable enough so that no fractures occurred even at room temperature were obtained. The average dimensions of the dry gels were 26.5 mm outer diameter, 5.3 mm inner diameter and 332 mm length. The yield of dry gels was 70%.

Sintering

The 7 dry gels were sintered as described in Example 7 and 7 preforms for optical fibers were obtained. The yield of preforms from dry gels was 100%. The dimensions of the preforms averaged 18.5 mm inner diameter and 231 mm length. The diameter of the core averaged 7.4 mm.

The hydroxide groups in the preforms for optical fibers were measured by measuring the infrared absorption spectrum. No absorption peak was seen when the wavelength was 2.7 μm. This indicated that the number of hydroxide groups in the preform was less than 1 ppm.

Furthermore, no foaming occurred when an optical fiber was formed by wire drawing. High quality optical fibers were obtained.

As can be seen in this embodiment by doping germaniumat 10 mole % into the hydrolyzed solution, a preform for optical fiber of multimode step-index type was provided.

EXAMPLE 15

Preparation of Hydrolyzed Solutions 218 ml of anhydrous ethanol was added to 549.2 g of refined commercially available silicon ethoxide and the solution was completely stirred. 190.0 g of 0.2 normal hydrochloric acid was added and the solution was stirred violently in order to hydrolyze the silicon ethoxide. The solution was referred to as "Solution A."

55 ml of anhydrous ethanol was added to 119.5 g of refined commercially available silicon ethoxide and the solution was completely stirred. 11.7 g of 0.2 normal hydrochloric acid was added and the solution was stirred violently for 1 hour. 20.5 g of germanium tetra ethoxide was added slowly to the solution with stirring. The reaction continued for 20 minutes and then 35.5 g of 0.2 normal hydrochloric acid was added with stirring. The solution was referred to as "Solution B."

55 ml of anhydrous ethanol was added to 108.9 g of refined commercially available silicon ethoxide and the solution was completely stirred. 11.7 g of 0.2 normal hydrochloric acid was added and the solution was stirred violently for 1 hour. 32.77 g of germanium tetra ethoxide was added slowly with stirring. After the reaction had continued for 20 minutes, 35.3 g of 0.2 normal hydrochloric acid was added with stirring. The solution waas referred to as "Solution C."

55 ml of anhydrous ethanol was added to 105.4 g of refined commercially available silicon ethoxide and the solution was completely stirred. 11.7 g of 0.2 normal hydrochloric acid was added and the solution was stirred violently for 1 hour. 36.8 g of germanium tetra ethoxide was slowly added to the solution with stirring. After the reaction had continued for 20 minutes, 35.2 g of 0.2 normal hydrochloric acid was added with stirring to yield "Solution D."

Preparation of a Solution Containing Ultrafine Particle Silica 1174.6 g of refined commercially available silicon ethoxide, 627.8 ml of anhydrous ethanol, 376.6 ml of ammonia water (29%) and 406.4 g of water were mixed. The solution was stirred violently for 2 hours and then maintained in a cool dark place overnight without stirring in order to synthesize the ultrafine particle silica. 8000 ml of the solution were concentrated under reduced pressure to a volume of 900 ml of the pH of the solution was adjusted from 8.10 to 4.00 by the addition of 2 normal hydrochloric acid. Foreign particles and the like were removed by centrifugal separation and 1000 ml of a solution containing 338.8 g of ultrafine particle silica having a mean particle diameter of 0.14 μm was obtained. The concentration of silica in the solution containing ultrafine particle silica was calculated to be 0.339 g/ml.

Preparation of Sol Solutions and Gelation

Solution A and 4/7 of the solution containing ultrafine particle silica were mixed and the solution was referred to as "Sol Solution A."

Similarly, Solution B and 1/7 of the solution containing ultrafine particle silica were mixed and the pH of the solution was lowered by adding 2 normal hydrochloric acid. The solution was referred to as 'Sol Solution B."

In a similar manner, Solution c and 1/7 of the solution containing ultrafine particle silica were mixed and the pH of the solution was lowered by adding 2 normal hydrochloric acid. The solution was referred to as "Sol Solution C."

Similarly, Solution D and 1/7 of the solution containing ultrafine particle silica were mixed and the pH of the solution was lowered by addition of 2 normal hydrochloric acid. The solution was referred to as "Sol Solution D."

The pH of sol solution A was adjusted to 5.32 by addition of 0.2 normal ammonia water and water and the volume was adjusted to 1600 ml. The solution was referred to as "pH Adjusted Sol Solution A." The concentration of effective glass component in pH Adjusted Sol Solution A was calculated to be 0.220 g/ml. 471.23 ml of pH Adjusted Sol Solution A were placed into a vinyl chloride cylindrical rotating container having a silicon coated inner surface. The dimensions of the cylindrical container were 40 mm inner diameter, 520 mm length and 628.3 ml volume. The ends of the container were covered with lids and the container was set in a rotating machine. Thirty minutes after the pH of Sol Solution A was adjusted to 5.32, rotation was begun at a rotating rate of 1200 RPM. The sol was gelled in 15 minutes, but rotation was continued for an additional 10 minutes. A tubular wet gel of 40 mm outer diameter, 20 mm inner diameter and 500 mm length was obtained.

Separately, the pH of Sol Solution B was adjusted to 4.22 by addition of 0.2 normal ammonia water and water and the volume was adjusted to 400 ml. This solution was referred to as "pH Adjusted Sol Solution B." The concentration of effective glass component in pH Adjusted Sol Solution B was calculated to be 2.280 g/ml.

The cylindrical container was removed from the rotating machine and set upright. Twelve minutes after gelation of the tubular wet gel, 100.53 ml of pH Adjusted Sol Solution B were placed into the center hole of the tubular wet gel. The ends of the container were covered and the container was again set in the rotating machine and immediately rotated at a rate of 1200 RPM. The sol was gelled within 15 minutes of the time the pH of Sol Solution B was adjusted to 4.22, but the rotation was continued for an additional 8 minutes. A tubular wet gel having 2 layers of different dopant concentration and an inner diameter of 12 mm was obtained.

Separately, the pH of Sol Solution C was adjusted to 3.23 by addition of 0.2 normal ammonia water and water and the volume was adjusted to 400 ml. This solution was referred to as "pH Adjusted Sol Solution C." The concentration of the effective glass component of pH Adjusted Sol Solution C was calculated to be 3.328 g/ml.

The cylindrical container was again removed from the rotating machine and set upright. Ten minutes after gelation of the 2 layer tubular wet gel, 50.26 ml of pH Adjusted Sol Solution C was placed in the center hole of the tubular wet gel. The ends of the container were covered and the container was again set in the rotating machine and immediately rotated at a rate of 1200 RPM. The sol was gelled in 15 minutes from the time the pH of Sol Solution C was adjusted to 3.23, but the rotation was continued for an additional 8 minutes. A tubular wet gel having 3 concentric layers and an inner diameter of 4 mm was obtained.

Separately, the pH of Sol Solution D was adjusted to 3.13 by addition of 0.2 normal ammonia water and the volume was adjusted to 400 ml. This solution was referred to as "pH Adjusted Sol Solution D." The concentration of the effective glass component of pH Adjusted Sol Solution D was calculated to be 2.344 g/ml.

Again, the cylindrical container was removed from the rotating machine and set upright. Ten minutes after the gelation of the 3 layer tubular wet gel, pH Adjusted Sol Solution D was placed into the center hole of the tubular wet gel. The sol was gelled without rotating in 10 minutes from the time the pH of Sol Solution D was adjusted to 3.13. A wet gel consisting of four concentric layers of different dopant concentrations was obtained.

Drying

Ten wet gels formed as described were aged in sealed cylindrical rotating containers at 30° C. for 2 days. The gels were then placed into a polypropylene drying container having openings amounting to 0.1% of the surface area of the container. The container was placed in a dryer at 60° C. and maintained for 17 days. Seven dry gels that were stable enough so that no fractures occurred even at room temperature were obtained. The average dimensions of the dry gels were 26.5 mm diameter and 333 mm length. The yield of dry gels was 70%.

Sintering

The 7 dry gels were sintered as described in Example 7 and 7 transparent glass preforms were obtained. The yield of preforms from dry gels was 100%.

The dimensions of the preforms were 18.5 mm outer diameter and 231 mm length. The diameter of the layer in which germanium was doped at 10 mole %, i.e. the layer in the center, was 1.85 mm. The outer diameter of the layer in which Ge was doped at 8.89 mole %, i.e. the layer next to the center layer was 5.55 mm; the inner diameter of this layers was 1.85 mm. The outer diameter of the layer in which Ge was doped at 5.56 mole %, i.e. the second layer from the center, was 9.25 mm; the inner diameter of this layer was 5.55 mm. The outer diameter of the layer in which Ge was not doped, i.e. the outermost layer, was 18.5 mm; the inner diameter of this layer was 9.26 mm.

The transparent glass preforms were placed in the sintering oven and maintained at 1490° C. for 1 hour in order to obtain preforms for optical fibers of graded-index multimode type in which the refractive index changes smoothly in the radial direction.

The hydroxide group in the preforms was measured by measuring the infrared absorption spectrum. No absorption peak was seen at a wavelength of 2.7 μm, indicating that the number of hydroxide groups in the present material was less than 1 ppm.

Furthermore, no foaming occurred even when an optical fiber was formed by wire drawing. High quality optical fiber was obtained.

As can be seen in this example, by preparing four pH adjusted sol solutions of different dopant concentrations and forming transparent glass preforms from the sol solutions and treating the transparent glass at high temperature, preforms for optical fiber of graded index multimode type in which the refractive index distribution changes smoothly in the radial direction can be obtained.

Furthermore, if even more pH adjusted sol solutions of different dopant concentrations are prepared and transparent glass preforms consisting of more layers using these sol solutions are made, good results are be obtained. The preforms are treated at higher temperatures and performs for optical fibers of graded index multimode type having excellent band characteristics are obtained.

EXAMPLE 16

Using a cylindrical rotating container of 60 mm inner diameter and 2020 mm length, a dry gel was formed following all of the steps of EXAMPLE 7, except for the amounts of each sol solution placed into the cylindrical container. The yield of dry gels was 50%.

At present, there is no such thing as a sintering oven in which such a long dry gel can be sintered. Accordingly, the dry gel can be made only partially transparent and preforms for optical fibers cannot be obtained. However, considering the fact that the yield in the sintering step is good, it is believed that it would be easy to produce a preform for optical fibers longer than 1 m with practically acceptable yield in accordance with this invention.

EXAMPLE 17

Preparation of Hydrolyzed Solutions 152 ml of anhydrous ethanol was added to 247.1 g of refined commercially available silicon ethoxide and the solution was completely stirred. 85.5 g of 0.02 normal hydrochloric acid was added and the solution was stirred violently in order to hydrolyze the silicon ethoxide. The resulting solution was referred to as "Solution A." 28 ml of anhydrous ethanol was added to 60.7 g of refined commercially available silicon ethoxide and the solution was completely stirred. 5.5 g of 0.02 normal hydrochloric acid was added and the solution was stirred violently for 1 hours. 1.81 g of titanium tetra ethoxide in 10 ml of anhydrous ethanol was added to the solution with stirring. After the reaction had continued for 20 minutes, 15.9 g of 0.02 normal hydrochloric acid was added to the reaction solution with stirring. The solution was referred to as "Solution B."

Preparation of a Solution Containing Ultrafine Particle Silica

A solution containing ultrafine particle silica was prepared as described in Example 7 except that all amounts were halved.

Preparation of Sol Solutions and Gelation

Solution A and 72% of the solution containing ultrafine particle silica were mixed and the resulting solution was referred to as "Sol Solution A." Similarly, Solution B and 18% of the solution containing ultrafine particle silica were mixed and the resulting solution was referred to as "Sol Solution B."

The pH of Sol Solution A was adjusted to 5.50 by addition of 0.2 normal ammonia water and water and the volume was adjusted to 800 ml. The concentration of the effective glass component in pH adjusted Sol Solution A was calculated to be 0.198 g/ml.

301.6 ml of pH adjusted Sol Solution A was placed into a vinyl chloride cylindrical rotating container having a silicon coated inner surface. The container has the dimensions 40 mm inner diameter, 270 mm length and 314.2 ml capacity. The ends of the container were covered and the container was set in a rotating machine. Thirty minutes from the time the pH of Sol Solution A was adjusted to 5.50, rotation was begun at a rotating rate of 1200 RPM. The sol was gelled 13 minutes from the start of the rotation, but the rotation was contained. A tubular wet gel was obtained.

Separately the pH of Sol Solution B was adjusted to 6.12 by addition of 0.2 normal ammonia water and water and the volume was adjusted to 200 ml. The concentration of the effective glass component of pH adjusted Sol Solution B was calculated to be 2.225 g/ml.

The cylindrical container was removed from the rotating machine and set upright. Twelve minutes after the gelation of the tubular wet gel, pH adjusted Sol Solution B was placed into the center hole of the wet gel. Sol Solution B was gelled 12 minutes from the time the pH of Sol Solution B was adjusted to 6.12. A wet gel consisting of concentric layer of different dopant concentrations was obtained.

Drying

Ten wet gels formed as described were aged in sealed cylindrical containers at 30° C. for 2 days. The gels were then placed into a polypopylene drying container having openings amounting to 0.1% of the surface area of the container. The container was placed in a dryer for 17 days. Seven dry gels which were stable enough so that no fractures occurred even at room temperature were obtained. The average dimensions of the dry gels were 26.4 mm diameter and 165 mm length. The yield of dry gels was 70%.

Sintering

The 7 dry gels were sintered as described in Example 7 and 7 preforms for optical fibers were obtained. The yield of preforms from dry gels was 100%. The dimensions of the preforms averaged 18.5 mm diameter and 231 mm length. The diameters of the averaged 3.7 mm.

The hydroxide groups in the preforms were measured by measuring the infrared absorption spectrum. No absorption peak was seen at a wavelength of 2.7 $\mu$m. This indicated that the number of hydroxide groups in the preforms was less then 1 ppm.

In this Example, titanium was doped in the hydrolyzed solution at a molar ratio of 1.2 mole %. It is also acceptable for the titanium to be doped in amounts up to 7 mole %.

EXAMPLE 18

Preparation of Hydrolyzed Solutions 199.5 g of 0.02 normal hydrochloric acid was added to 576.6 g of refined commercially available silicon ethoxide and the solution was stirred violently in order to hydrolyze the silicon ethoxide. The resulting solution was referred to as "Solution A."

17.4 g of 0.2 normal hydrochloric acid was added to 134.1 g or refined commercially available silicon ethoxide and the solution was stirred violently while the temperature was maintained below 5° C. After about 30 minutes, the solution became uniformly transparent. While the solution was maintained at a temperature less than 5° C., 11.65 g of germanium tetra ethoxide was slowly added with stirring in order to carry out the hydrolysis of the germanium tetra ethoxide. The reaction conditions were maintained constant for 20 minutes and then 32.3 g of water was added while maintenance of the solution temperature at less than 5° C. was continued. The resulting solution was referred to as "Solution B."

Preparation of a Fumed Silica Dispersed Solution 500 g of fumed silica having a mean particle diameter of 0.15 μm was slowly added to 1000 ml of water with sufficient stirring. The fumed silica was prepared by a known gas-phase method. Ultrasonic vibration was applied to the solution for 4 hours in order to uniformly disperse the silica particles. Masses of fumed silica were removed by centrifugal separation and filtration in order to yield a fumed silica dispersed solution.

Preparation of Sol Solutions and Gelation

Solution A and 609.8 g of the fumed silica dispersed solution were mixed and the resulting solution was referred to as "Sol Solution A." Similarly, Solution B and 152.5 g of the fumed silica dispersed solution were mixed and the resulting solution was referred to as "Sol Solution B."

The pH of Sol Solution A was adjusted to 5.00 by addition of 0.2 normal ammonia water and water and the volume of Sol Solution A was adjusted to 1600 ml. The concentration of the effective glass component of Sol Solution A after the pH adjustment was calculated to be 0.2310 g/ml.

1206.4 ml of the pH adjusted Sol Solution A was placed into a cylindrical rotating container. The cylindrical container was made of vinyl chloride and had a silicon coated inner surface. The dimensions of the container were 40 mm inner diameter, 1020 mm length and 1256.6 ml volume. Both ends of the cylindrical rotating container were covered with lids and the container was set in a rotating machine. Thirty minutes after the pH was adjusted to 5.00, rotation of the cylindrical container containing the pH adjusted sol solution was begun at a rotating rate of 1000 RPM. The sol was gelled 20 minutes after the rotation began, but the rotation was continued for an additional 10 minutes in order to yield a tubular wet gel. The tubular wet gel had dimensions of 40 mm outer diameter, 80 mm inner diameter and 1000 mm length and was contained in the cylindrical rotating container.

Separately, the pH of Sol Solution B was adjusted to 4.2 using 0.2 normal ammonia water and water and the volume of Sol Solution B was adjusted to 400 ml. The concentration of the effective glass component of the pH adjusted Sol Solution B was calculated to be 0.2355 g/ml.

The cylindrical container containing the tubular wet gel was removed from the rotating machine and set upright. pH adjusted Sol Solution B was placed into the center hole of the wet gel in the cylindrical container 15 minutes after the tubular wet gel was formed. pH adjusted Sol Solution B was also gelled within 20 minutes from the time the pH was adjusted. A wet gel having concentric layers of different dopant concentrations was obtained.

Drying 10 wet gels formed as described were aged in sealed cylindrical rotating containers at 30° C. for 2 days. Then the wet gels were placed into box containers of polypropylene having openings amounting to 0.4% of the surface area of the container. The container was placed in a dryer at 60° C. and the wet gels were dried. After drying the gels for 14 days, 10 dry gels which stable enough so that no fractures occurred even at room temperature were obtained. Yield of dry gels: 100%. The mean dimensions of the dry gels were 27.0 mm outer diameter and 675 mm length.

Sintering

The dry gels were placed into a tubular quartz sintering oven and heated from 30° to 200° C. at a heating rate of 30° C. per hour, maintained at 200° C. for 5 hours, and then heated from 200° to 300° C. at a heating rate of 30° C. per hour and maintained at 300° C. for 5 hours in order to remove absorbed water.

The gels were heated from 300° to 1100° C. at a heating rate of 30° C. per hour and maintained at 1100° C. for 30 minutes in order to remove carbon and ammonium chloride and to accelerate the dehydration concentration reaction.

The gels were cooled to 700° C. and maintained at 700° C. while a mixture of helium (He) and chlorine ($Cl_2$) flowed through the sintering oven at rates of 2 l/min and 0.2 l/min, respectively. Then the gels were heated to 800° C. at a heating rate of 60° C. per hour while He only flowed through the oven. The gels were maintained at 800° C. for 1 hour while a mixture of He and $Cl_2$ flowed through the oven at rates of 2 l/min and 0.2 l/min, respectively. The gels were then heated to 900° C. at a heating rate of 60° C. per hour while He only flowed through the oven and the gels were maintained at 900° C. for 1 hour while a mixture of He and $Cl_2$ flowed through the oven at rates of 2 l/min and 0.2 l/min, respectively in order to remove hydroxide groups.

The resulting gels were heated to 1050° C. at a heating rate of 60° C. per hour while a mixture of He and oxygen ($O_2$) flowed through the oven at rates of 2 l/min and 0.4 l/min, respectively, and the gels were maintained at 1050° C. for 10 hours in order to remove chloride. The gels were heated to 1250° C. at a heating rate of 30° C. per hour while He only flowed through the oven and the gels were maintained at 1250° C. for 30 minutes in order to close the pores in the gels.

The gels were placed into a box oven and heated from 1200° to 1350° C. at a heating rate of 60° C. per hour. The gels were maintained at 1350° C. for 1 hour. The gels became non-porous and transparent preforms for optical fibers were obtained.

There were no fractions during sintering and the yield of preforms from dry gels was 100%. The dimensions of the preforms for optical fibers were 18.8 mm diameter and 470 mm length. The diameter of the core was 3.7 mm and the loss was less than 1%.

The number of hydroxide groups in the preforms was estimated by measuring the infrared absorption spectrum. No absorption peak was seen at a wavelength of 2.7 μm, indicating that the number of hydroxide groups was less than 1 ppm.

Furthermore, even when a jacket tube of silica was fused to the preform for optical fibers and the preform was fiber drawn, no foaming occurred and high quality single mode optical fiber was obtained.

EXAMPLE 19

Solutions A and B were prepared as described in Example 18 except that 0.02 normal nitric acid was used instead of 0.02 normal hydrochloric acid and 0.2 normal nitric acid was used instead of 0.2 normal nitric acid. Solutions A and B were each pH adjusted and mixed with the fumed silica dispersed solution in the same manner as described in Example 18. Furthermore, Sol Solutions A and B were gelled, dried and sintered as described in Example 18. The yield of preforms for optical fibers was 90%.

Similar preforms for optical fibers were obtained when the starting Solutions A and B were prepared using sulfuric acid or acetic acid instead of hydrochloric acid or nitric acid.

EXAMPLE 20

The steps of Example 18 were performed using silicon methoxide as the silicon alkoxide in Solutions A and B. 421.1 g of silicon methoxide was to prepare Solution A and 97.9 g of silicon methoxide was used to prepare Solution B. All other steps were carried out exactly as described in Example 18. The yield of preforms for optical fibers was 90%.

EXAMPLE 21

199.5 g of 0.02 normal hydrochloric acid was added to 576.6 g of refined commercially available silicon ethoxide and the solution was stirred violently in order to hydrolyze the silicon ethoxide. The resulting solution was referred to as "Solution A."

11.6 g of 0.02 normal hydrochloric was added to 134.1 g of refined commercially available silicon ethoxide. The temperature was maintained below 5° C. and the solution was stirred violently. After about 50 minutes had elapsed, the reaction solution became transparent, but was also partially gelled. The solution was, therefore, nonuniform.

Extensive experimentation showed that even when the silicon ethoxide was partially hydrolyzed with water at a molar ratio of less than about 1 mole of water per mole of silicon ethoxide, the resulting solution did not become uniform.

EXAMPLE 22

199.5 g of 0.02 normal hydrochloric acid was added to 576.6 g of refined commercially available silicon ethoxide and the solution was stirred violently in order to hydrolyze the silicon ethoxide. The resulting solution was referred to as "Solution A."

40.6 g of 0.2 normal hydrochloric acid was added to 134.1 g of refined commercially available silicon ethoxide. The temperature was maintained at least than 50° C. and the solution was stirred violently. The reaction solution became transparent after about 25 minutes had elapsed. While maintenance of the solution at a temperature below 5° C. was continued, 11.65 g of germanium tetra ethoxide was slowly added. The reaction solution was turbid and a uniform solution was not obtained.

Extensive experimentation showed that when silicon ethoxide was partially hydrolyzed with water at a molar ratio of more than about 3 moles of water per mole of silicon ethoxide, and germanium tetraethoxide was added into the solution containing excess water, a turbidity resulted and the distribution of silica and germania did not become uniform.

EXAMPLE 23

17.4 g of 0.2 normal hydrochloric acid was added to 134.1 g of refined commercially available silicon ethoxide and the solution was stirred violently. Gelation of the reaction solution began after about 30 minutes had elapsed.

Extensive experimentation showed that gelation was likely to occur unless the reaction solution was kept at a temperature less than about 10° C. Furthermore, unless a temperature of less than 10° C. was maintained during the steps of adding germanium tetra alkoxide and of hydrolysis, gelation occurred readily and undesirably.

EXAMPLE 24

Preparation of Hydrolyzed Solutions 218 ml of anhydrous ethanol was added to 549.1 g of refined commercially available silicon ethoxide and the solution was completely stirred. 190.0 g of 0.02 normal hydrochloric acid was added and the solution was stirred violently in order to hydrolyze the silicon ethoxide. The resulting solution was referred to as "Solution A."

55 ml of anhydrous ethanol was added to 127.7 g of refined commercially available silicon ethoxide and the solution was completely stirred. Then 11.0 g of 0.02 normal hydrochloric acid was added and the solution was stirred violently for 1 hour. 11.10 g of germanium tetraethoxide was slowly added into the reaction solution in order to carry out the hydrolysis. After 20 minutes, 36.3 g of 0.02 normal hydrochloric acid was added and the solution was stirred in order to complete the hydrolysis. The resulting solution was referred to as "Solution B."

Preparation of Fumed Silica Dispersed Solution 500 g of fumed silica having a mean particle diameter of 0.15 μm was slowly added to 1000 ml of water with sufficient stirring. The fumed silica had been prepared by a known gas-phase method. Ultrasonic vibration was applied to the solution for 4 hours in order to uniformly disperse the silica particles. Masses of fumed silica were removed using centrifugal and separation and filtration and a fumed silica dispersed solution was obtained.

Preparation of Sol Solutions and Gelation

Solution A and 580.8 g of the fumed silica dispersed solution were mixed and the solution was referred to as "Sol Solution A." Similarly, Solution B and 145.2 g of the fumed silica dispersed solution were mixed and the solution was referred to as "Sol Solution B."

The pH of Sol Solution A was adjusted to 5.5 by addition of 0.2 normal ammonia water and water and the volume was adjusted to 1600 ml. The concentration of the effective glass component of the pH adjusted Sol Solution A was calculated to be 0.220 g/ml. 1206.4 ml of the pH adjusted Sol Solution A was placed into a vinyl chloride cylindrical rotating container having a silicon coated inner surface. The dimensions of the container were 40 mm inner diameter, 1020 mm length and 1256.6 ml volume. Both ends of the cylindrical rotating container were covered with lids and the container was set in a rotating machine. Thirty minutes after the pH of Sol Solution A was adjusted, rotation of the container was begun at a rate of 1200 RPM. Sol Solution A was gelled within 15 minutes after the rotation began, but the rotation was continued for additional 10 minutes. A tubular wet gel of 40 mm outer diameter, 8.0 mm inner diameter and 1000 mm length was obtained inside the cylindrical rotating container.

Separately, the pH of Sol Solution B was adjusted to 5.1 by addition of 0.2 normal ammonia water and water and the volume was adjusted to 400 ml. The concentration of effective glass component in pH adjusted Sol Solution B was calculated to be 0.2245 g/ml.

The cylindrical container was removed from the rotating machine and set upright. 10 minutes after the gelation was completed, Sol Solution B was placed into the center hole of the tubular wet gel in the cylindrical container. 20 minutes after the pH of Sol Solution B was adjusted to 5.1, Sol Solution B was gelled and a wet gel containing concentric layers was obtained.

Drying 20 wet gels formed as described were aged in sealed cylindrical rotating containers at 30° C. for 2 days. 10 of the 20 wet gels were then placed into polypropylene drying containers having openings amounting to 0.1% of the surface area of the container. The other 10 gels were left in the cylindrical containers and the ends were covered with lids having openings amounting to 0.1% of the surface area of the lid.

All of the wet gels were placed into a dryer at 60° C. After drying the gels for 17 days, dry gels which stable enough so that no fractures occurred even at room temperature were obtained. The dry gels had average dimensions of 26.5 mm outer diameter and 664 mm length. The yield of dry gels placed in the drying container was 90% and the yield of dry gels remaining in the cylindrical rotating containers was 80%.

Sintering

The 17 remaining dry gels were sintered as described in Example 18 and preforms for optical fibers were obtained with a yield of 100%. The dimensions of the preforms were 18.5 mm outer diameter and 463 mm length. The diameter of the core was 3.7 mm.

The hydroxide groups were measured by measuring the infrared absorption spectrum. No absorption peak was seen at a wavelength of 2.7 μm, indicating that the number of hydroxide groups was less than 1 part per million.

Furthermore, no foaming occurred even when optical fiber was produced by fiber drawing. The optical fiber was of high quality.

As can be seen in this example, when Solutions A and B are prepared using alcohol, it is not necessary to cool the solutions. This is more practical than the case in which alcohol is not used.

Additionally, the viscosity of the hydrolyzed solutions, the sol solution and the ultrafine particle silica containing solution was lowered when alcohol was used. The solutions were, therefore, easy to handle.

EXAMPLE 25

Preparation of Hydrolyzed Solutions 218 ml of anhydrous enthanol was added to 549.1 g of refined commercially available silicon ethoxide and the solution was completely stirred. 190.0 g of 0.02 normal hydrochloric acid was added to the solution and the solution was stirred violently in order to hydrolyze the silicon ethoxide. The solution was referred to as "Solution A."

55 ml of anhydrous ethanol was added to 127.7 g of refined commercially available silicon ethoxide and the solution was stirred. 11.0 g of 0.02 normal hydrochloric acid was added to the solution and the solution was stirred violently for 1 hour.

135.4 g of germanium tetra isopropoxide was slowly added to the solution and the solution was stirred. 20 minutes later, 36.3 g of 0.02 normal hydrochloric acid was added to the solution and the hydrolysis was carried out with sufficient stirring. The solution was referred to as "Solution B."

Preparation of Fumed Silica Dispersed Solution 500 g of fumed silica having a mean particle diameter of 0.17 μm was slowly added to 1000 ml of water with sufficient stirring. The fumed silica had been prepared by a known gas-phase method. Ultrasonic vibration was applied to the solution for 4 hours in order to uniformly disperse the silica particles. Masses of fumed silica were removed by centrifugal separation and filtration in order to yield the fumed silica dispersed solution.

Preparation of Sol Solutions and Gelation

Solution A and 590.5 g of the fumed silica dispersed solution were mixed and ultrasonic vibration was applied in order to uniformly disperse the ultrafine particle silica in the solution. The resulting solution was referred to as "Sol Solution A."

Similarly, Solution B and 145.2 g of the fumed silica dispersed solution were mixed and ultrasonic vibration was applied in order to uniformly disperse the ultrafine particle silica in the solution. The resulting solution was referred to as "Sol Solution B."

The pH of Sol Solution A was adjusted to 5.5 by addition of 0.2 normal ammonia water and water and the volume was adjusted to 1600 ml. The concentration of the effective glass component in pH adjusted Sol Solution A was calculated to be 0.220 g/ml. 1206.4 ml of pH adjusted Sol Solution A was placed into a metal cylindrical rotating container having a silicon coated inner surface. The dimensions of the cylindrical rotating container were 40 mm inner diameter, 1020 mm length and 1256.6 ml volume. Both ends of the container were covered with lids and the container was set in a rotating machine. Thirty minutes after the pH of Sol Solution A was adjusted to 5.5, rotation was begun. The rotation rate was 1500 RPM. The sol gelled in 21 minutes, but rotation was continued for an additional 20 minutes. A tubular wet gel was formed inside the cylindrical rotating container. The wet gel had dimensions of 8 mm inner diameter, 40 mm outer diameter and 1000 mm length.

Separately, the pH of Sol Solution B was adjusted to 5.2 by addition of 0.2 normal ammonia water and water and the volume was adjusted to 400 ml. The concentration of the effective glass component in pH adjusted Sol Solution B was calculated to be 0.2243 g/ml. The cylindrical rotating container was removed from the rotating machine and set upright. Twenty-three minutes after the tubular wet gel was gelled, pH adjusted Sol Solution B was placed into the center hole of the tubular wet gel. Sol Solution B was gelled 18 minutes after the pH was adjusted to 5.2. A wet gel having concentric layers was obtained.

Drying 10 dry gels formed as described were aged in sealed cylindrical rotating containers at 30° C. for 2 days. Then the dry gels were placed into a drying container having openings amounting to 0.1% of the surface area of the container and the container was placed into a dryer at 58° C. By drying the wet gels for 17 days, 10 dry gels were obtained. The dry gels were sufficiently stable so that fracturing did not occur even at room temperature. The average dimensions of the dry gels were 26.2 mm outer diameter and 658 mm length. The yield of dry gels was 100%.

Sintering

The 10 dry gels were sintered as described in Example 18 and preforms for optical fibers were obtained. The yield of preforms was 100%. The dimensions of the preforms averaged 18.5 mm diameter and 463 mm length. The diameter of the core averaged 3.7 mm.

The hydroxide groups in the preforms were measured by measuring the infrared absorption spectrum. No absorption peak was seen at a wavelength of 2.7 μm, indicating that the number of hydroxide groups in the preform was less than 1 ppm.

No foaming occurred when optical fibers were formed by wire drawing. The quality of the optical fibers was high.

EXAMPLE 26

Preparation of Hydrolyzed Solutions 218 ml of anhydrous ethanol was added to 549.1 g of refined commercially available silicon ethoxide and the solution was completely stirred. 190.0 g of 0.2 normal hydrochloric acid was added and the solution was stirred violently in order to hydrolyze the silicon ethoxide. The solution was referred to as "Solution A."

55 ml of anhydrous ethanol was added to 127.7 g of refined commercially available silicon ethoxide and the solution was completely stirred. 11.0 g of 0.2 normal hydrochloric acid was added and the solution was stirred violently for 1 hour. 11.10 g of germanium tetra ethoxide was slowly added to the solution with stirring. After 20 minutes, 36.3 g of 0.2 normal hydrochloric acid was added. The solution was referred to as "Solution B."

Preparation of Fumed Silica Dispersed Solution 500 g of fumed silica having a mean particle diameter of 0.15 μm was slowly added to 3066 ml of water with sufficient stirring. The fumed silica had been prepared by a known gas-phase method. Ultrasonic vibration was applied to the solution for 4 hours in order to more uniformly disperse the silica particles. Masses of fumed silica were removed by centrifugal separation and filtration in order to yield the fumed silica dispersed solution.

Preparation of Sol Solutions and Gelation

Solution A and 1380.8 g of the fumed silica dispersed solution were mixed and the resulting solution was referred to as "Sol Solution A." Similarly, Solution B and 345.2 g of the fumed silica dispersed solution were mixed and the solution was referred to as "Sol Solution B."

The pH of Sol Solution A was adjusted to 5.60 by addition of 0.2 normal ammonia water and water and the volume was adjusted to 2400 ml. The concentration of effective glass component in pH adjusted Sol Solution A was calculated to be 0.15 g/ml.)

1206.4 ml of pH adjusted Sol Solution A was placed into a vinyl chloride cylindrical rotating container having a silicon coated inner surface. The container had the dimensions 40 mm inner diameter, 1020 mm length and 1256.6 ml volume. Both ends of the cylindrical rotating container were covered with lids and the container was set in a rotating machine. Thirty minutes after the pH of Sol Solution A was adjusted, rotation of the cylindrical container was begun at a rotating rate of 1500 RPM. Sol Solution A was gelled in 25 minutes after the rotation began, but the rotation was continued for another 20 minutes in order to yield a tubular wet gel inside the cylindrical container. The dimensions of the tubular wet gel were 40 mm outer diameter, 8.0 mm inner diameter and 1000 mm length.

Separately, the pH of Sol Solution B was adjusted to 5.3 by addition of 0.2 normal ammonia water and water and the volume was adjusted to 600 ml. The concentration of effective glass component in pH adjusted Sol Solution B was calculated to be 0.153 g/ml.

The cylindrical rotating container was removed from the rotating machine and set upright. Thirty minutes after the tubular wet gel had been gelled, Sol Solution B was placed into the center hole of the tubular wet gel. Thirty minutes from the time the pH of Sol Solution B was adjusted to 5.12, Sol Solution B was also gelled. A wet gel having concentric layers was obtained.

Drying 10 wet gels formed as described were aged in a sealed cylindrical rotating container at 30° C. for 2 days. The gels were then placed into a drying container having openings amounting to 0.1% of the surface area of the container. The container was placed into a dryer and dried at 60° C. for 17 days. Three dry gels were obtained. The dry gels were sufficiently stable so that no fractures occurred even at room temperature. The average dimensions of the dry gels were 23.2 mm outer diameter and 584 mm length. The yield of dry gels was 30%.

Sintering

The 3 dry gels were sintered as described in Example 18 and preforms for optical fibers were obtained. The yield of preforms from dry gels was 100%. The average dimensions of the preforms were 16.0 mm diameter and 401 mm length. The average diameter of the core was 3.2 mm.

The hydroxide groups in the preforms were measured by measuring the infrared absorption spectrum. No absorption peak was seen at a wavelength of 2.7 μm. This indicated that the number of hydroxide groups in the preforms was less than 1 ppm.

Furthermore, no foaming occurred when optical fibers were formed by wire drawing. The optical fibers were of high quality.

As can be seen from this example, when the silicon concentration of the solution containing ultrafine particle silica was about 0.15 g/ml, resulting in a transparent glass preform having a volume of only 6.6% of the volume of the starting wet gel, high quality preforms for optical fibers are obtained. However, the yield of the preforms when they are dried is low, specifically, 30%, and this is not economical. Furthermore, since the degree of shrinkage is large, it is necessary to make large wet gels and this is not practical.

EXAMPLE 27

Preparation of Hydrolyzed Solutions 155 ml of anhydrous ethanol was added to 427.2 g of refined commercially available silicon ethoxide and the solution was completely stirred. 147.8 g of 0.02 normal hydrochloric acid was added and the solution was stirred violently in order to hydrolyze the silicon ethoxide. The resulting solution was referred to as "Solution A."

39 ml of anhydrous ethanol was added to 97.1 g of refined commercially available silicon ethoxide and the solution was completely stirred. 8.4 g of 0.02 normal hydrochloric acid was added and the solution was stirred violently for one hour. 11.0 g of germanium tetra ethoxide was slowly added to the solution with stirring. After the reaction had continued for 20 minutes, 28.4 g of 0.02 normal hydrochloric acid was added and the solution was stirred. The resulting solution was referred to as "Solution B."

Preparation of Fumed Silica Dispersed Solution 500 g of fumed silica having a mean particle diameter of 0.15 μm was slowly added to 1000 ml of water with sufficient stirring. The fumed silica had been obtained by a known gas-phase method. Ultrasonic vibration was applied to the solution for 4 hours in order to uniformly disperse the silica particles. Masses of fumed silica were removed by centrifugal separation and filtration in order to yield a fumed silica dispersed solution.

Preparation of Sol Solutions and Gelation

Solution A and 686.4 g of the fumed silica dispersed solution were mixed and the solution was referred to as "Sol Solution A." Similarly, Solution B and 171.6 g of the fumed silica dispersed solution were mixed and the solution was referred to as "Sol Solution B."

The pH of Sol Solution A was adjusted to 5.3 by addition of 0.2 normal ammonia water and water and the volume was adjusted to 1600 ml. The concentration of the effective glass component in pH adjusted Sol Solution A was calculated to be 0.220 g/ml.

1206.4 ml of pH adjusted Sol Solution A were placed into a vinyl chloride cylindrical rotating container having a silicon coated inner surface. The dimensions of the cylindrical rotating container were 40 mm inner diameter, 1020 mm length and 1256.6 ml volume. Both ends of the container were covered with lids and the container was set in a rotating machine. Thirty minutes after the pH of Sol Solution A was adjusted, rotation began at a rotating rate of 1200 RPM. Sol Solution A was gelled 15 minutes after the start of rotation at a constant rate, but the rotation was continued for another 10 minutes. A tubular wet gel having dimensions of 40 mm outer diameter, 8 mm inner diameter and 1000 mm length was obtained.

Separately, the pH of Sol Solution B was adjusted to 5.0 by addition of 0.2 normal ammonia water and water and the volume was adjusted to 400 ml. This was referred to as "pH Adjusted Sol Solution B." The concentration of effective glass component was calculated to be 0.2243 g/ml.

The cylindrical rotating container was removed from the rotating machine and set upright. Twelve minutes after the tubular wet gel was gelled, Sol Solution B was placed into the center hole of the tubular wet gel. Twenty minutes after the pH of Sol Solution B was adjusted to 5.0, Sol Solution B was gelled and a wet gel of concentric layers was obtained. The dimensions of the wet gel were 40 mm outer diameter and 1000 mm length.

Drying 10 wet gels formed as described were aged in sealed cylindrical rotating containers at 30° C. for 3 days and then placed into a polypropylene drying container having openings amounting to 0.1% of the surface area of the container. After 15 days, 9 dry gels, which were stable enough so that fracturing did not occur even at room temperature, were obtained. The average dimensions of the dry gels were 27.0 mm outer diameter and 675 mm length. The yield of dry gels was 90%.

Sintering

The dry gels were placed in a tubular quartz sintering oven and heated from 30° to 200° C. at a heating rate of 30° C. per hour, maintained at 200° C. for 5 hours, heated from 200° to 300° C. at a heating rate of 30° C. per hour and maintained at 300° C. for 5 hours in order to remove absorbed water.

Then the gels were heated from 300° to 1050° C. at a heating rate of 30° C. per hour and maintained at 1050° C. for 30 minutes in order to remove carbon and ammonium chloride and to accelerate the dehydration concentration reaction. The gels were cooled to 700° C. and maintained at 700° C. while a mixture of He and $Cl_2$ flowed through the oven at rates of 2 l/min and 0.2 l/min, respectively. The gels were heated to 800° C. at a heating rate of 60° C. per hour while He gas only flowed through the oven. The dry gels were maintained at 800° C. for one hour while a mixture of He and $Cl_2$ flowed through the oven at rates of 2 l/min and 0.2 l/min, respectively. The gels were heated to 900° C. at a rate of 60° C. per hour while He gas only flowed through the oven. The dry gels were maintained at 900° C. for one hour while a mixture of He and $Cl_2$ flowed through the oven at rates of 2 l/min and 0.2 l/min, respectively, in order to remove hydroxide groups.

The gels were then heated to 1000° C. at a rate of 60° C. per hour while a mixture of He and $O_2$ flowed through the oven at rates of 2 l/min and 0.4 l/min, respectively. The gels were maintained at 1000° C. for 10 hours in order to remove chloride.

The gels were heated further to 1250° C. at a rate of 30° C. per hour while He only flowed through the oven. The gels were maintained at 1250° C. for 30 minutes in order to close the pores in the gels.

Four of the dry gels were placed in a box oven and heated from 1200° to 1350° C. at a heating rate of 60° C. per hour. The gels were maintained at 1350° C. for 1 hour in order to make the dry gels non-porous and to yield the transparent preforms for optical fibers. The yield of preforms was 100%.

The remaining 5 dry gels were heated to 1600° C. using a ring heater in order to make the gels non-porous. Transparent preforms for optical fibers were obtained, with a yield of 100%.

The dimensions of the preforms averaged 18.5 mm diameter and 461 mm length. The average diameter of the core was 3.7 mm.

The hydroxide groups in the preforms for optical fibers were measured by measuring the infrared absorption spectrum. No absorption peak was seen at a wavelength of 2.7 μm, indicating that the number of hydroxide groups in the preforms was less than 1 ppm.

Furthermore, no foaming occurred when optical fibers were formed by wire drawing. High quality optical fibers were obtained.

In this example, the ratio of effective glass component of Solution A and the solution containing ultrafine particle silica was 35:65; in Example 24, the ratio of effective glass component in Solution A and in the solution containing ultrafine particle silica was 45:55. Using these solutions, equally high quality preforms for optical fibers were obtained, but the optimal sintering conditions were different.

Extensive experimentation showed that suitable ratios of the effective glass component in Solution A to the effective glass component in the solution containing ultrafine particle silica ranged between about 20:80 and 80:20.

EXAMPLE 28

Preparation of Hydrolyzed Solutions 218 ml of anhydrous ethanol was added to 549.1 g of refined commercially available silicon ethoxide and the solution was completely stirred. 190.0 g of 0.2 normal hydrochloric acid was added and the solution was stirred violently in order to hydrolyze the silicon ethoxide. The resulting solution was referred to as "Solution A."

55 ml of anhydrous ethanol was added to 127.7 g of refined commercially available silicon ethoxide and the solution was completely stirred. 11.0 g of 0.2 normal hydrochloric acid was added and the solution was stirred violently for 1 hour. 11.10 g of germanium tetra ethoxide was slowly added to the solution with stirring. After the reaction had continued for 20 minutes, 36.3 g of 0.02 normal hydrochloric acid was added and the solution was stirred. The solution was referred to as "Solution B."

Preparation of Fumed Silica Dispersed Solution 500 g of fumed silica having a mean particle diameter of 0.33 μm was slowly added to 1000 ml of water with sufficient stirring. The fumed silica had been obtained by a known gas-phase method. Ultrasonic waves were applied to the solution for 4 hours in order to uniformly disperse the silica particles. Masses of fumed silica were removed by centrifugal separation and filtration in order to yield the fumed silica dispersed solution.

Preparation of Sol Solutions and Gelation

Solution A and 580.9 g of the fumed silica dispersed solution were mixed and the solution was referred to as "Sol Solution A." Similarly, Solution B and 145.2 g of the fumed silica dispersed solution were mixed and the solution was referred to as "Sol Solution B."

The pH of Sol Solution A was adjusted to 5.6 by addition of 0.2 normal ammonia water and water and the volume was adjusted to 1600 ml. The concentration of the effective glass component of pH adjusted Sol Solution A was calculated to be 0.220 g/ml. 1206.4 ml of pH adjusted Sol Solution A was placed into a vinyl chloride cylindrical rotating container having a silicon coated inner surface. The dimensions of the cylindrical rotating container were 40 mm inner diameter, 1020 mm length and 1256.6 ml volume. The ends of the container were covered with lids and the container was set in a rotating machine. Thirty minutes after the pH of Sol Solution A was adjusted to 5.6, rotation of the cylindrical container was begun at a rotating rate of 1500 RPM. Sol Solution A was gelled 18 minutes after starting the rotation, but rotation was continued for an additional 15 minutes in order to yield a tubular wet gel.

Separately, the pH of Sol Solution B was adjusted to 5.2 by addition of 0.2 normal ammonia water and water and the volume was adjusted to 400 ml. The solution was referred to as "pH Adjusted Sol Solution B." The concentration of effective glass component in pH Adjusted Sol Solution B was calculated to be 0.2243 g/ml.

The cylindrical rotating container was removed from the rotating machine and set upright. Eighteen minutes after the tubular wet gel was gelled, Sol Solution B was placed into the center hole of the tubular wet gel. Fifteen minutes after the pH of Sol Solution B was adjusted to 5.2, Sol Solution B was gelled. A wet gel consisting of concentric layers was obtained.

Drying 10 wet gels formed as described were aged in sealed cylindrical rotating containers at 30° C. for 3 days. The gels were then placed into a drying container having openings amounting to 0.1% of the surface area of the container. The drying container was placed in a dryer at 65° C. for 15 days. Seven dry gels which were stable enough so that no fractures occurred even at room temperature were obtained. The average dimensions of the dry gels were 28.0 mm outer diameter and 700 mm length. The yield of dry gels was 70%.

Sintering

The 7 dry gels were sintered as described in Example 18 and 7 preforms for optical fibers were obtained. The yield of preforms from the dry gels was 100%. The average dimensions of the preforms were 18.4 mm diameter and 462 mm length and the diameter of the core averaged 3.6 mm.

The hydroxide groups in the preforms for optical fibers was measured by measuring the infrared absorption spectrum. No absorption peak was seen when the wavelength was 2.7 μm, indicating that the number of hydroxide groups in the preforms was less than 1 ppm.

Furthermore, no foaming occurred when optical fiber was formed by wire drawing. High quality optical fibers were obtained.

As can be seen in this example, when the mean particle diameter of the ultrafine particle silica was 0.33 μm a preform for optical fibers can be obtained. Further extensive experimentation demonstrated that when the mean particle diameter of the ultrafine particle silica was more than 1 μm, the particles settled out during the rotating gelation and it was difficult to form a dry gel.

EXAMPLE 29

Preparation of Hydrolyzed Solutions

Solutions A and B were prepared as described in Example 24.

Preparation of Fumed Silica Dispersed Solution

A fumed silica dispersed solution was prepared as described in Example 24.

Preparation of Sol Solutions and Gelation

The sol solutions were prepared and gelled as described in Example 24, except that the rate of rotation of the cylindrical rotating container was 50,000 RPM. The particles of silica settled out due to the strong centrifugal force resulting from the rotation. Settling out of the silica could be seen with the naked eye. As a result of the settling out of the ultrafine silica particles, all of the gels fractured during the step of drying the wet gels.

Extensive experimentation showed that when a cylindrical rotating container having an inner diameter of 40 mm is used, the rate of rotating the container should be less than 5000 RPM. If a smaller cylindrical rotating container having an inner diameter of, for example, 5 mm, is used, a complete dry gel can be obtained by shortening the rotation time.

EXAMPLE 30

Preparation of Hydrolyzed Solutions

Solutions A and B were prepared as described in Example 24.

Preparation of a Solution Containing Ultrafine Particle Silica

A fumed silica dispersed solution was prepared as described in Example 24.

Preparation of Sol Solutions and Gelation

Sol Solutions A and B were prepared as described in Example 24.

The pH of Sol Solution A was adjusted to 5.5 by addition of 0.2 normal ammonia water and water and the volume was adjusted to 1600 ml. The concentration of effective glass component of pH adjusted Sol Solution A was calculated to be 0.220 g/ml. 1158.1 ml of pH adjusted Sol Solution A was placed into a metal cylindrical rotating container having a silicon coated inner surface. The dimensions of the cylindrical rotating container were 40 mm inner diameter, 1020 mm length and 1256.6 ml volume. The ends of the container were covered with lids and the container was set in a rotating machine. Thirty minutes after the pH of Sol Solutions A was adjusted to 5.5, rotation of the container at a rotating rate of 1500 RPM was begun. Sol Solution A was gelled 15 minutes after rotation began, but the rotation was continued for an additional 10 minutes. A tubular wet gel having dimensions of 40 mm outer diameter, 11.2 mm inner diameter and 1000 mm length was obtained.

Separately, the pH of Sol Solution B was adjusted to 5.1 by addition of 0.2 normal ammonia water and water and the volume was adjusted to 400 ml. This was referred to as "pH Adjusted Sol Solution B." The concentration of the effective glass component in pH Adjusted Sol Solution B was calculated to be 0.2243 g/ml.

The cylindrical rotating container was removed from the rotating machine and set upright. Twelve minutes after the gelation of the tubular wet gel, 48.25 ml of pH Adjusted Sol Solution B was placed into the center hole of the tubular wet gel. The ends of the container were covered and the container was again set in the rotating machine and immediately rotated at a rate of 1500 RPM. Sol Solution B was gelled 18 minutes after the pH was adjusted to 5.1, but rotation was continued for an additional 10 minutes. A tubular wet gel having dimensions of 40 mm outer diameter, 8.0 mm inner diameter and 1000 mm length was obtained.

Drying 10 wet gels formed as described were aged in sealed cylindrical rotating containers at 30° C. for 2 days. The gels were then placed into a drying container of polypropylene having openings amounting to 0.1% of the surface area of the container. The container was placed in a dryer at 60° C. for 17 days. Nine dry gels which were stable enough so that no fractures occurred even at room temperature were obtained. The average dimensions of the dry gels were 26.5 mm outer diameter, 5.3 mm inner diameter and 663 mm length. The yield of dry gels was 90%.

Sintering

Nine dry gels were sintered as described in Example 24 and 9 preforms for optical fibers were obtained. The yield of preforms from dry gels was 100%. The dimensions of the preforms obtained were 18.5 mm outer diameter, 3.7 mm inner diameter and 463 mm length. The diameter of the core was 5.2 mm.

An optical fiber was formed by collapsing and fiber drawing the preform.

The hydroxide groups in the preform for optical fibers was measured by measuring the infrared absorption spectrum. No absorption peak was seen at a wavelength of 2.7 μm. This indicated that the number of hydroxide groups in the preform was less than 1 ppm.

Furthermore, no foaming occurred during fiber drawing and high quality optical fibers were obtained.

EXAMPLE 31

Preparation of Hydrolyzed Solutions 218 ml of anhydrous ethanol was added to 549.2 g of refined commercially available silicon ethoxide and the solution was completely stirred. 190 g of 0.02 normal hydrochloric acid was added and the solution was stirred violently in order to hydrolyze the silicon ethoxide. The solution was referred to as "Solution A."

55 ml of anhydrous ethanol was added to 105.4 g of refined commercially available silicon ethoxide and the solution was completely stirred. 11.7 g of 0.2 normal hydrochloric acid was added and the solution was stirred violently for 1 hour. 36.84 g of germanium tetra ethoxide was added slowly to the solution with stirring. After 20 minutes, 35.2 g of 0.2 normal hydrochloric acid was added with stirring. The resulting solution was referred to as "Solution B."

Preparation of Fumed Silica Dispersed Solution 500 g of fumed silica having a mean particle diameter of 0.15 um was slowly added to 1000 ml of water with sufficient stirring. The fumed silica had been prepared by a known gas-phase method. Ultrasonic vibration was applied to the solution to uniformly disperse the silica particles. Masses of fumed silica were removed by centrifugal separation and filtration in order to yield the fumed silica dispersed solution.

Preparation of Sol Solutions and Gelation

Solution A and 580.8 g of the fumed silica dispersed solution were mixed and the solution was referred to as "Sol Solution A." Similarly, Solution B and 145.2 g of the fumed silica dispersed solution were mixed. The pH of Sol Solution B was lowered by addition of 2 normal hydrochloric acid and the solution was referred to as "Sol Solution B."

The pH of Sol Solution A was adjusted to 5.5 by addition of 0.2 normal ammonia water and water and the volume was adjusted to 1600 ml. The concentration of effective glass component in pH adjusted Sol Solution A was calculated to be 0.220 g/ml. 527.8 ml of pH adjusted Sol Solution A was placed into a vinyl chloride cylindrical rotating container having a silicon coated inner surface. The dimensions of the cylindrical container were 40 mm inner diameter, 520 mm length and 628.3 ml volume. The ends of the container were covered with lids and the container was set in a rotating machine. Thirty minutes after the pH of Sol Solution A was adjusted to 5.5, rotation of the cylindrical container was begun at a rotating rate of 1800 RPM. Sol Solution A was gelled within 15 minutes of the start of rotation, but the rotation was continued for an additional 10 minutes. A tubular wet gel having dimensions of 40 mm outer diameter, 16 mm inner diameter and 500 mm length was obtained.

Separately, the pH of Sol Solution B was adjusted to 3.0 by addition of 0.2 normal ammonia water and water and the volume was adjusted to 400 ml. This solution was referred to as "pH Adjusted Sol Solution B." The concentration of the effective glass component in pH Adjusted Sol Solution B was calculated to be 0.2344 g/ml.

The cylindrical rotating container containing the tubular wet gel was removed from the rotating machine and set upright.

Fifteen minutes after the tubular wet gel was gelled, pH Adjusted Sol Solution B was placed into the center hole of the tubular wet gel. Twenty-two minutes after pH of Sol Solution B was adjusted to 3.0, a wet gel consisting of concentric layers was obtained.

Drying 10 wet gels formed as described were aged in sealed cylindrical rotating containers at 30° C. for 2 days. The gels were placed into a polypropylene drying container having openings amounting to 0.1% of the surface area of the container. The drying container was placed in a dryer at 60° C. for 17 days. Seven dry gels that were stable enough so that no fractures occurred even at room temperature were obtained. The average dimensions of the dry gels were 26.5 mm outer diameter, 10.6 mm inner diameter and 332 mm length. The yield of dry gels was 70%.

Sintering

The 7 dry gels were sintered as described in Example 24 and 7 preforms for optical fibers were obtained. The yield of preforms from dry gels was 100%. The dimensions of the preforms averaged 18.5 mm inner diameter and 231 mm length. The diameter of the core averaged 7.4 mm.

The hydroxide groups in the preforms for the optical fiber were measured by measuring the infrared absorption spectrum. No absorption peak was seen when the wavelength was 2.7 μm. This indicated that the number of hydroxide groups in the preform was less than 1 ppm.

Furthermore, no foaming occurred when an optical fiber was formed by wire drawing. High quality optical fibers were obtained.

As can be seen in this embodiment by doping germanium at 10 mole % into the hydrolyzed solution, a preform for optical fiber of multimode step-index type was provided.

EXAMPLE 32

Preparation of Hydrolyzed Solutions 218 ml of anhydrous ethanol was added to 549.2 g of refined commercially available silicon ethoxide and the solution was completely stirred. 190.0 g of 0.2 normal hydrochloric acid was added and the solution was stirred violently in order to hydrolyze the silicon ethoxide. The solution was referred to as "Solution A."

55 ml of anhydrous ethanol was added to 119.5 g of refined commercially available silicon ethoxide and the solution was completely stirred. 11.7 g of 0.2 normal hydrochloric acid was added and the solution was stirred violently for 1 hour. 20.5 g of germanium tetra ethoxide was added slowly to the solution with stirring. The reaction continued for 20 minutes and then 35.5 g of 0.2 normal hydrochloric acid was added with stirring. The solution was referred to as "Solution B."

55 ml of anhydrous ethanol was added to 108.9 g of refined commercially available silicon ethoxide and the solution was completely stirred. 11.7 g of 0.2 normal hydrochloric acid was added and the solution was stirred violently for 1 hour. 32.77 g of germanium tetra ethoxide was added slowly with stirring. After the reaction had continued for 20 minutes, 35.3 g of 0.2 normal hydrochloric acid was added with stirring. The solution was referred to as "Solution C."

55 ml of anhydrous ethanol was added to 105.4 g of refined commercially available silicon ethoxide and the solution was completely stirred. 11.7 g of 0.2 normal hydrochloric acid was added and the solution was stirred violently for 1 hour. 36.8 g of germanium tetra ethoxide was slowly added to the solution with stirring. After the reaction had continued for 20 minutes, 35.2 g of 0.2 normal hydrochloric acid was added with stirring to yield "Solution D."

Preparation of Fumed Silica Dispersed Solution 500 g of fumed silica having a mean particle diameter of 0.15 μm was slowly added to 1000 ml of water with sufficient stirring. The fumed silica had been prepared by a known gas-phase method. Ultrasonic vibration was applied to the solution for 4 hours in order to uniformly disperse the silica particles. Masses of fumed silica were removed by centrifugal separation and filtration to yield the fumed silica dispersed solution.

Preparation of Sol Solutions and Gelation

Solution A and 580.8 g of the fumed silica dispersed solution were mixed and the solution was referred to as "Sol Solution A."

Similarly, Solution B and 145.2 g of the fumed silica dispersed solution were mixed and the pH of the solution was lowered by adding 2 normal hydrochloric acid. The solution was referred to as "Sol Solution B."

In a similar manner, Solution C and 145.2 g of the fumed silica dispersed solution were mixed and the pH of the solution was lowered by adding 2 normal hydrochloric acid. The solution was referred to as "Sol Solution C."

Similarly, Solution D and 145.2 g of the fumed silica dispersed solution were mixed and the pH of the solution was lowered by addition of normal hydrochloric acid. The solution was referred to as "Sol Solution D."

The pH of Sol Solution A was adjusted to 5.5 by addition of 0.2 normal ammonia water and water and the volume was adjusted to 1600 ml. The solution was referred to as "pH Adjusted Sol Solution A." The concentration of effective glass component in pH Adjusted Sol Solution A was calculated to be 0.220 g/ml. 471.23 ml of pH Adjusted Sol Solution A were placed into a vinyl chloride cylindrical rotating container having a silicon coated inner surface. The dimensions of the cylindrical container were 40 mm inner diameter, 520 mm length and 628.3 ml volume. The ends of the container were covered with lids and the container was set in a rotating machine. Thirty minutes after the pH of Sol Solution A was adjusted to 5.5, rotation was begun at a rotating rate of 1500 RPM. pH Adjusted Sol Solution A was gelled in 15 minutes, but rotation was continued for an additional 10 minutes. A tubular wet gel of 40 mm outer diameter, 20 mm inner diameter and 500 mm inner diameter and 500 mm length was obtained.

Separately, the pH of Sol Solution B was adjusted to 4.2 by addition of 0.2 normal ammonia water and water and the volume was adjusted to 400 ml. This solution was referred to as "pH Adjusted Sol Solution B." The concentration of effective glass component in pH Adjusted Sol Solution B was calculated to be 2.280 g/ml.

The cylindrical container was removed from the rotating machine and set upright. Twelve minutes after gelation of the tubular wet gel, 100.53 ml of pH Adjusted Sol Solution B were placed into the center hole of the tubular wet gel. The ends of the container were covered and the container was again set in the rotating machine and immediately rotated at a rate of 1500 RPM. The sol was gelled within 15 minutes of the time the pH of Sol Solution B was adjusted to 4.21, but the rotation was continued for an additional 8 minutes. A tubular wet gel having 2 layers of different dopant concentration and an inner diameter of 10 mm was obtained.

Separately, the pH of Sol Solution C was adjusted to 3.2 by addition of 0.2 normal ammonia water and water and the volume was adjusted to 400 ml. This solution was referred to as "pH Adjusted Sol Solution C." The concentration of of the effective glass component of pH Adjusted Sol Solution C was calculated to be 2.328 g/ml.

The cylindrical container was again removed from the rotating machine and set upright. Ten minutes after gelation of the two layer tubular wet gel, 50.26 ml of pH Adjusted Sol Solution C was placed in the center hole of the tubular wet gel. The ends of the container were covered and the container was again set in the rotating machine and immediately rotated at a rate of 1500 RPM. The sol was gelled in 15 minutes from the time the pH of Sol Solution C was adjusted to 3.2, but the rotation was continued for an additional 10 minutes. A tubular wet gel having 3 concentric layers and an inner diameter of 4 mm was obtained.

Separately, the pH of Sol Solution D was adjusted to 3.10 by addition of 0.2 normal ammonia water and water and the volume was adjusted to 400 ml. This solution was referred to as "pH Adjusted Sol Solution D." The concentration of the effective glass component of pH Adjusted Sol Solution D was calculated to be 2.344 g/ml.

Again, the cylindrical container was removed from the rotating machine and set upright. Ten minutes after the gelation of the 3 layer tubular wet gel, pH Adjusted Sol Solution D was placed into the center hole of the tubular wet gel. The sol was gelled without rotating in 12 minutes from the time the pH of Sol Solution D was adjusted to 3.10. A wet gel consisting of four concentric layers of different dopant concentrations was obtained.

Drying

Ten wet gels formed as described were aged in sealed cylindrical rotating containers at 30° C. for 2 days. The gels were then placed into a polypropylene drying container having openings amounting to 0.1% of the surface area of the container. The container was placed in a dryer at 60° C. and maintained for 17 days. Seven dry gels that were stable enough so that no fractures occurred even at room temperature were obtained. The average dimensions of the dry gels were 26.5 mm diameter and 333 mm length. The yield of dry gels was 70%.

Sintering

The 7 gels were sintered as described in Example 24 and 7 transparent glass preforms were obtained. The yield of preforms from dry gels was 100%.

The dimensions of the preforms were 18.5 mm outer diameter and 231 mm length. The diameter of the layer in which germanium was doped at 10 mole %, i.e. the layer in the center, was 1.85 mm. The outer diameter of the layer in which Ge was doped at 8.89 mole %, i.e. the layer next to the center layer was 5.55 mm; the inner diameter of this layer was 1.85 mm. The outer diameter of the layer in which Ge was doped at 5.56 mole %, i.e. the second layer from the center, was 9.25 mm; the inner diameter of this layer was 5.55 mm. The outer diameter of the layer in which Ge was not doped, i.e. the outermost layer, 18.5 mm; the inner diameter of this layer was 9.25 mm.

The transparent glass preforms were placed in the sintering oven and maintained at 1490° C. for 1 hour in order to obtain preforms for optical fibers of graded-index multimode type in which the refractive index changes smoothly in the radial direction.

The hydroxide group in the preforms was measured by measuring the infrared absorption spectrum. No absorption peak was seen at a wavelength of 2.7 μm, indicating that the number of hydroxide groups in the parent material was less than 1 ppm.

Furthermore, no foaming occurred even when an optical fiber was formed by wire drawing. High quality optical fiber was obtained.

As can be seen in this example, by preparing four pH adjusted sol solutions of different dopant concentrations, forming transparent glass preforms from the sol solutions and treating the transparent glass at high temperature, preforms for optical fibers of graded-index multimode type in which the refractive index distribution changes smoothly in the radial direction can be obtained.

Furthermore, if even more pH adjusted sol solutions of different dopant concentrations are prepared and transparent glass preforms consisting of more layers are made using these sol solutions, good results are obtained. The preforms are treated at higher temperatures and preforms for optical fibers of graded index multimode type having excellent band characteristics are obtained.

EXAMPLE 33

Using a cylindrical rotating container of 60 mm inner diameter and 2020 mm length, a dry gel was formed following all of the steps of the process of Example 24 except for the amount of pH adjusted sol solutions placed into the cylindrical container. The yield of dry gels was 50%.

At present, there is no such thing as a sintering oven in which such a long dry gel can be sintered. Accordingly, the dry gel can be made only partially transparent and preforms for optical fibers cannot be obtained. However, considering the fact that the yield in the sintering step is good, it is believed that it would be easy to produce a preform for optical fibers longer than 1 m with practically acceptable yield in accordance with this invention.

Furthermore, titanium (Ti), aluminum (Al), zirconium (Zr), and the like can also be used in preparing the preforms for optical fibers.

Additionally, fumed silica can be prepared by methods other than the gas-phase method. Wet process methods, ammonia synthesizing methods and the like can be used. The method of preparing the fumed silica is selected according to grade and cost of the optical fibers being made.

As has been demonstrated, high quality preforms for silicic optical fibers are provided in accordance with the present invetion. The preforms are large enough to be of practical utility and are provided at lower cost than preforms provided using conventional gas phase methods. Furthermore, not only can preforms for optical fibers of single mode type be provided, but, in addition, preforms for many other optical fibers can be provided. The preforms for other optical fibers include multimode graded index type, multimode step index type, large diameter high NA step index type and the like. For this reason, preforms for optical fibers prepared in accordance with the present invention are expected to be used in a wide variety of fields, including the field of optical fiber communications.

It will thus be seen that the objects set forth above, among those made apparent in the preceding description, are efficiently attained and, since certain changes may be made in carrying out the above method without departing from the spirit and scope of the invention, it is intended that all matter contained in the above description shall be interpreted as illustrative and not a limiting sense.

It is also to be understood that the following claims are intended to cover all of the generic and specific features of the invention herein described and all statements of the scope of the invention which, as a matter of language, might be said to fall therebetween.

What is claimed is:

1. A method of preparing preforms for optical fibers comprising:
   preparing a first sol solution of a silicon alkoxide hydrolyzed with an acid and ultrafine particle silica;
   placing the first sol solution into a container;
   gelling the first sol solution while the container is being rotated at a predetermined rotation rate to obtain a first wet gel having a center hole;
   preparing a second sol solution having a different composition than the first sol solution;
   filling the center hole of the first wet gel with the second sol solution;

gelling the second sol solution in the first wet gel to obtain a second wet gel;

drying the first and second wet gels to form a first and second dry gel composite; and sintering the first and second dry gel composite to obtain a preform for optical fibers.

2. The method of claim 1, wherein the silicon alkoxide has the general formula Si(OR)$_4$ wherein R is an alkyl group having 1 to 3 carbon atoms.

3. The method of claim 2, wherein the silicon alkoxide is silicon tetraethoxide.

4. The method of claim 1, wherein at least one of the first and second sol solutions includes a dopant.

5. The method of claim 4, wherein the dopant is selected from the group consisting of metal alkoxide having the formula M(OR)$_x$ wherein M is a metal, R is an alkyl group having less than 20 carbon atoms and x is an integer equal to the valence of the metal.

6. The method of claim 5, wherein the dopant is selected from the group consisting of lithium, sodium, potassium, cesium, boron, aluminum, gallium, germanium, nitrogen, phosphorus, fluorine, ziroconium, titanium, tantalum, tellurium lead and silver.

7. The method of claim 5, wherein the dopant is metal alkoxide.

8. The method of claim 7, wherein the metal alkoxide is germanium tetraalkoxide.

9. The method of claim 8, wherein the germanium tetraalkoxide is germanium tetraethoxide.

10. The method of claim 4, wherein the silicon alkoxide is silicon tetraethoxide and the dopant is gemanium tetraethoxide.

11. The method of claim 4, wherein the dopant is doped to sol solution.

12. The method of claim 4, wherein the dopant is doped in the form of fine particles.

13. The method of claim 1, wherein the container is a cylindrical container formed of a hydrophobic material.

14. The method of claim 1, wherein the second sol solution is gelled while the container is being rotated at a predetermined rate.

15. The method of claim 1, wherein the second sol solution is gelled without rotating the container.

16. The method of claim 1, wherein more than two sol solutions are gelled in the same container in sequential steps.

17. The method of claim 16, wherein the steps of preparing a sol solution of silicon alkoxide hydrolyzed with an acid, at least one dopant and ultrafine particle silica; placing the sol solution into a container; and, gelling the sol solution while the container is being rotated at a predetermined rotation rate are performed a multiplicity of times using sol solutions of different dopant concentrations in order to obtain a wet gel having a center hole and concentric gel layers of different dopant concentrations.

18. A method of preparing preforms for optical fibers comprising the steps of:

preparing a first sol solution of a silicon alkoxide hydrolyzed with an acid, a first concentration of more than 0% of metal alkoxide hydrolyzed with an acid, and ultrafine particle silica;

placing the first sol solution into a cylindrical container;

gelling the first sol solution while the cylindrical rotation container is being rotated at a predetermined rotation rate to obtain a first silica gel having a center hole;

preparing at least a second sol solution of silicon alkoxide hydrolyzed with an acid, metal alkoxide hydrolyzed with an acid at a second concentration which is different than said first concentration, and ultrafine particle silica;

filling the center hole of the first wet gel with the second sol solution;

gelling the second sol solution to a wet gel composite;

drying the wet gel composite to form a dry gel composite; and, sintering the dry gel composite to obtain a preform for optical fibers.

19. The method of claim 1 or 18, wherein the ultrafine particle silica is obtained by hydrolyzing a silicon alkoxide with a base.

20. The method of claim 1 or 18, wherein the ultrafine particle silica is fumed silica.

21. The method of claim 1 or 18, wherein the pH and effective glass content of the first sol solution are adjusted to first predetermined values prior to gelling said first sol solution.

22. The method of claim 1 or 18, wherein the pH and effective glass content of said second sol solution are adjusted to second predetermined values prior to gelling said second sol solution.

23. The method of claim 1 or 18, wherein said first sol solution is gelled while the cylindrical container is being rotated at a predetermined rotation rate between about 200 and 50,000 RPM.

24. The method of claim 1 or 18, wherein said preform comprises two concentric layers having different refractive indices.

25. The method of claim 18, wherein said metal alkoxide is germanium tetraalkoxide represented by the general formula Ge(OR)$_4$.

26. The method of claim 1 wherein at least one of said first and second sol solutions is prepared by:

partially hydrolyzing the silicon alkoxide with water at a molar ratio of between about 1 and 3 of water to silicon alkoxide;

adding a predetermined amount of metal alkoxide to the solution;

hydrolyzing remaining alkoxide groups with water to yield a hydrolyzed solution; and adding ultrafine particle silica to the hydrolyzed solution to obtain the sol solution.

27. The method of claim 25, wherein the hydrolyzed solution is prepared while the reaction temperature is maintained at a temperature less than about 10° C.

28. The method of claim 18, wherein the sol solution is prepared by:

mixing a silicon alkoxide and alcohol in a volume ratio of alcohol to silicon alkoxide of greater than about 20%;

adding water to the solution in a molar ratio of water to silicon alkoxide of between about 0.1 and 3.9;

adding metal alkoxide to the solution in a predetermined amount;

adding water to the solution in order to hydrolyze the remaining alkoxide groups and yield a hydrolyzed solution; and adding ultrafine particle silica to the hydrolyzed solution to yield the sol solution.

29. The method of claim 1 or 18, wherein the ultrafine particle silica added to the sol solution has a mean particle diameter of between about 0.01 and 1.0 $\mu$m.

30. The method of claim 1 or 18, wherein the ultrafine particle silica added to the sol solution is in a concetration of more than about 0.15 g/ml.

31. The method of claim 1 or 18, wherein the temperature and pH of the first sol solution and the second sol solution are adjusted so that gellation of each solution is completed in less than about 10 hours.

32. The method of claim 1 or 18 wherein the compositions of the first and second sol solutions are adjusted so that the volume of the preform is between about 5 and 15% of the volume of the combined wet gels.

33. The method of claim 1 or 18, wherein the wet gel is dried in the container and the container is provided with lids having openings amounting to less than about 10% of the surface area of the lid on both ends thereof.

34. The method of claim 1 or 18, wherein the wet gel is dried in a separate drying container having covers with openings amounting to less than about 10% of the surface area of the drying container.

35. The method of claim 1 or 18, wherein gels are dried at a first selected temperature between about 5° and 60° C. and heated to a second selected temperature between about 40° and 160° C. at a heating rate of less than about 120° C. per hour.

36. The method of claim 1 or 18, wherein the sintering step includes:
removing absorbed water by heating the gel to a third selected temperature;
removing carbon by heating the gel to a fourth selected temperature;
accelerating dehydration reaction and concentration of the gel;
removing hydroxyl groups;
removing chloride or fluoride and making the gel nonporous by heating the gel to fifth and sixth selected temperatures; and
converting the gel to a transparent glass by heating the gel to a seventh selected temperature.

37. The method of claim 36, wherein absorbed water is removed by at least one step of heating the gel to the third selected temperature between about 20° and 400° C. at a heating rate less than about 400° C. per hour and maintaining the gel at the third selected temperature for at least about one hour.

38. The method of claim 36, wherein carbon is removed by at least one step of heating the gel to the fourth selected temperature between about 400° and 900° C. at a heating rate between about 30° and 400° C. per hour.

39. The method of claim 36, wherein hydroxyl groups are removed by at least flowing a carrier gas selected from the group consisting of He, Ne, Ar, $N_2$, $O_2$ and a hydroxide group removing agent selected from the group consisting of $Cl_2$, SOCl, $SF_6$, $CF_4$, and $C_2F_6$ and $C_3F_8$ over the sintering gel at a ratio between about 1 and 40% with respect to the carrier gas.

40. The method of claim 39, wherein after removing hydroxyl groups, chloride or fluoride is removed by at least one step of flowing a carrier gas selected from the group consisting of He, Ne, Ar and $N_2$ and oxygen in an amount between about 1 and 100% with respect to the carrier gas over the sintering gel at a fifth selected temperature between about 800° and 1200° C., and the gel is made nonporous by heating the gel to a sixth selected temperature between about 900° and 1350° C. while pure He only flows over the sintering gel or while the gel is subjected to a vacuum and maintaining the gel at the sixth selected temperature for at least about one hour.

41. The method of claim 36, wherein the gel is converted to a transparent glass by heating the gel to a seventh selected temperature between about 1200° and 1600° C. and maintaining the gel at the seventh selected temperature for a period of time in order to effect the conversion.

* * * * *